US 6,678,000 B1

(12) United States Patent
Sakata

(10) Patent No.: US 6,678,000 B1
(45) Date of Patent: Jan. 13, 2004

(54) HIGH RESOLUTION STILL-IMAGE CAPTURE APPARATUS THAT SHIFTS PIXELS BY PLUS OR MINUS TWO-THIRDS PIXEL PITCH

(75) Inventor: Tsuguhide Sakata, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/102,654

(22) Filed: Jun. 23, 1998

(30) Foreign Application Priority Data

Jun. 27, 1997 (JP) .............................................. 9-172108

(51) Int. Cl.$^7$ .............................................. H04N 5/238
(52) U.S. Cl. ..................................... 348/369; 348/218.1
(58) Field of Search ....................... 348/209.99, 210.99, 348/219.1, 369, 218.1, 220.1, 344, 446

(56) References Cited

U.S. PATENT DOCUMENTS

| | | | |
|---|---|---|---|
| 5,053,896 A | | 10/1991 | Sakata et al. .................. 360/71 |
| 5,087,979 A | | 2/1992 | Schaertel ..................... 358/296 |
| 5,276,581 A | | 1/1994 | Sakata et al. ................ 360/137 |
| 5,402,171 A | * | 3/1995 | Tagami et al. ............... 348/219 |
| 5,457,544 A | | 10/1995 | Ochiai ......................... 358/404 |
| 5,877,807 A | * | 3/1999 | Lenz ............................ 348/218 |
| 6,069,664 A | * | 5/2000 | Zhu et al. .................... 348/446 |
| 6,108,036 A | * | 8/2000 | Harada et al. ............. 348/219.1 |
| 6,115,147 A | * | 9/2000 | Mizumoto et al. .......... 358/483 |
| 6,195,125 B1 | * | 2/2001 | Udagawa et al. ........... 348/218 |
| 6,256,066 B1 | * | 7/2001 | Yukawa et al. ............. 348/218 |

FOREIGN PATENT DOCUMENTS

| | | |
|---|---|---|
| EP | 0 669 757 | 8/1995 |
| EP | 0 758 831 | 2/1997 |

* cited by examiner

Primary Examiner—Wendy R. Garber
Assistant Examiner—Jason Whipkey
(74) Attorney, Agent, or Firm—Fitzpatrick, Cella, Harper & Scinto

(57) ABSTRACT

An image pickup apparatus has the following components: an imaging device provided with a color filter having a regular arrangement formed by repetition of an 8-pixel unit block having two pixels in the line direction and 4 pixels in the column direction; pixel-shifting device operative to shift a light beam impinging upon the imaging surface of the imaging device by an amount corresponding to ⅔ pixel pitch both in plus and minus directions; an image memory capable of storing at least 9 frames of pixel data outputted from imaging device; a memory controller for arranging the pixel data to be written in the image memory in a spatial arrangement equivalent to the pixel data obtained by an imaginary imaging device having pixels of a number three times as large as that of the imaging device in each of line and column directions; an adder circuit which performs a computation for mixing pixel data of a plurality of pixel lines read from the image memory; and a camera process circuit for processing the plural-line-mixed field-read pixel data outputted from the adder circuit.

44 Claims, 36 Drawing Sheets

2/3 PIXEL SHIFT

FILTER ARRANGEMENT OF IMAGING DEVICE (COMPLEMENTARY, STAGGERED)

| | | | | Field |
|---|---|---|---|---|
| C | Y | C | Y | 1 |
| G | M | G | M | 2 |
| C | Y | C | Y | 1 |
| M | G | M | G | 2 |

| C | Y | C | Y | C | Y | C | Y | C | Y | C | Y |
|---|---|---|---|---|---|---|---|---|---|---|---|
| G | M | G | M | G | M | G | M | G | M | G | M |
| C | Y | C | Y | C | Y | C | Y | C | Y | C | Y |
| G | M | G | M | G | M | G | M | G | M | G | M |
| C | Y | C | Y | C | Y | C | Y | C | Y | C | Y |
| G | M | G | M | G | M | G | M | G | M | G | M |
| C | Y | C | Y | C | Y | C | Y | C | Y | C | Y |
| M | G | M | G | M | G | M | G | M | G | M | G |
| C | Y | C | Y | C | Y | C | Y | C | Y | C | Y |
| M | G | M | G | M | G | M | G | M | G | M | G |
| C | Y | C | Y | C | Y | C | Y | C | Y | C | Y |
| M | G | M | G | M | G | M | G | M | G | M | G |

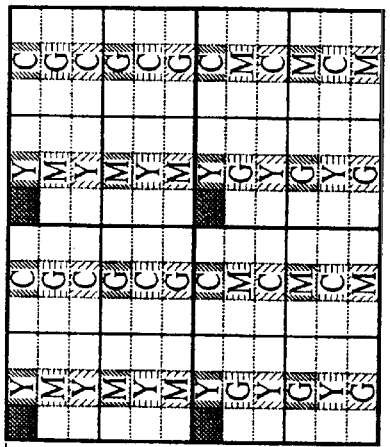
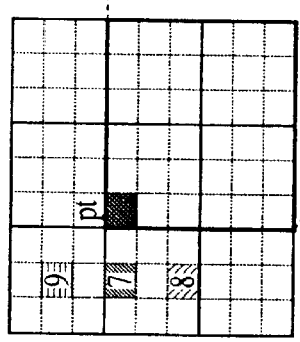
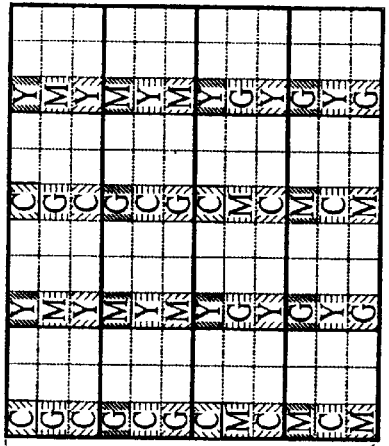
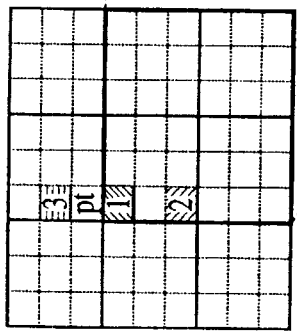
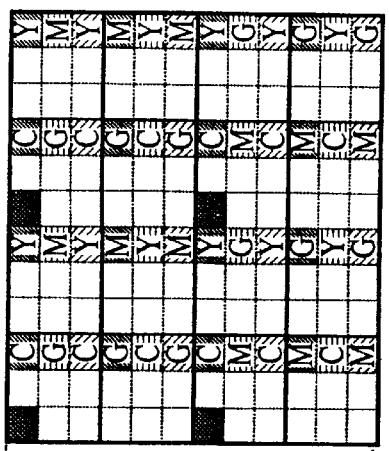
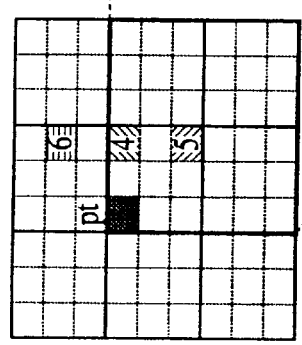
FIG. 4A  FIG. 4B  FIG. 4C

IMAGE DATA IN MEMORY

FIG. 5

| pt | Field | X | Y |
|---|---|---|---|
| 1 | 1 | 0 | 0 |
|   | 2 | 0 | 0 |
| 2 | 1 | 0 | 2/3 |
|   | 2 | 0 | 2/3 |
| 3 | 1 | 0 | -2/3 |
|   | 2 | 0 | -2/3 |
| 4 | 1 | 2/3 | 0 |
|   | 2 | 2/3 | 0 |
| 5 | 1 | 2/3 | 2/3 |
|   | 2 | 2/3 | 2/3 |
| 6 | 1 | 2/3 | -2/3 |
|   | 2 | 2/3 | -2/3 |
| 7 | 1 | -2/3 | 0 |
|   | 2 | -2/3 | 0 |
| 8 | 1 | -2/3 | 2/3 |
|   | 2 | -2/3 | 2/3 |
| 9 | 1 | -2/3 | -2/3 |
|   | 2 | -2/3 | -2/3 |

FIG. 6A

| pt | Field | X | Y |
|---|---|---|---|
| 1 | 1 | 0 | 0 |
|   | 2 | 0 | 0 |
| 2 | 1 | 0 | 2/3 |
|   | 2 | 0 | 2/3 |
| 3 | 1 | 0 | 4/3 |
|   | 2 | 0 | 4/3 |
| 4 | 1 | 2/3 | 0 |
|   | 2 | 2/3 | 0 |
| 5 | 1 | 2/3 | 2/3 |
|   | 2 | 2/3 | 2/3 |
| 6 | 1 | 2/3 | 4/3 |
|   | 2 | 2/3 | 4/3 |
| 7 | 1 | 4/3 | 0 |
|   | 2 | 4/3 | 0 |
| 8 | 1 | 4/3 | 2/3 |
|   | 2 | 4/3 | 2/3 |
| 9 | 1 | 4/3 | 4/3 |
|   | 2 | 4/3 | 4/3 |

FIG. 6B

FILTER ARRANGEMENT OF IMAGING DEVICE (RGB BAYER)

| | | | | Field |
|---|---|---|---|---|
| R | G | R | G | 1 |
| G | B | G | B | 2 |
| R | G | R | G | 1 |
| G | B | G | B | 2 |

FIG. 7A

| R | G | R | G | R | G | R | G | R | G | R | G |
|---|---|---|---|---|---|---|---|---|---|---|---|
| G | B | G | B | G | B | G | B | G | B | G | B |
| R | G | R | G | R | G | R | G | R | G | R | G |
| G | B | G | B | G | B | G | B | G | B | G | B |
| R | G | R | G | R | G | R | G | R | G | R | G |
| G | B | G | B | G | B | G | B | G | B | G | B |
| R | G | R | G | R | G | R | G | R | G | R | G |
| G | B | G | B | G | B | G | B | G | B | G | B |
| R | G | R | G | R | G | R | G | R | G | R | G |
| G | B | G | B | G | B | G | B | G | B | G | B |
| R | G | R | G | R | G | R | G | R | G | R | G |
| G | B | G | B | G | B | G | B | G | B | G | B |

FIG. 7B

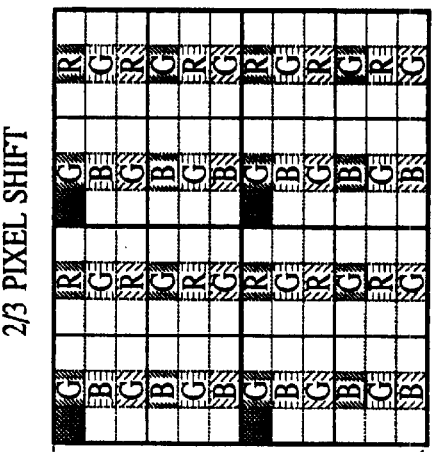
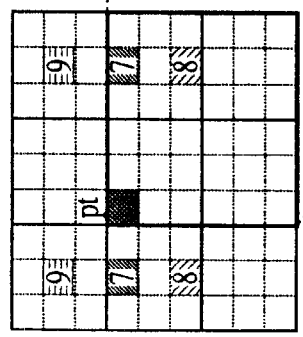
FIG. 8A
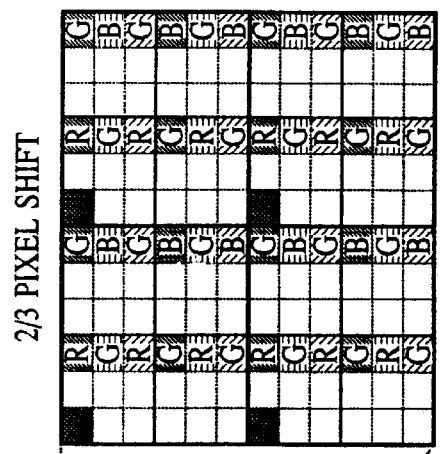
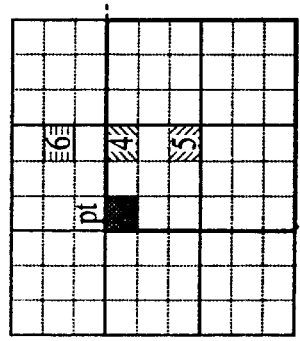
FIG. 8B
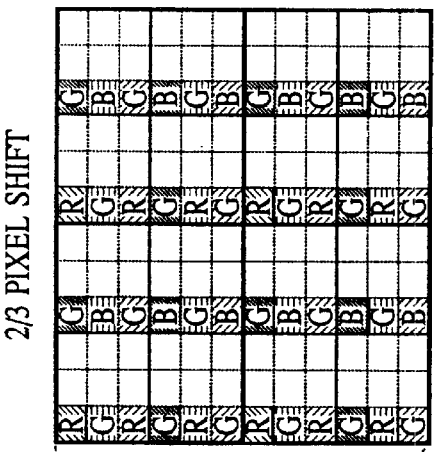
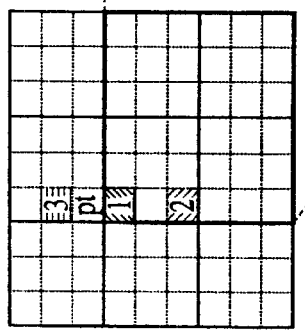
FIG. 8C

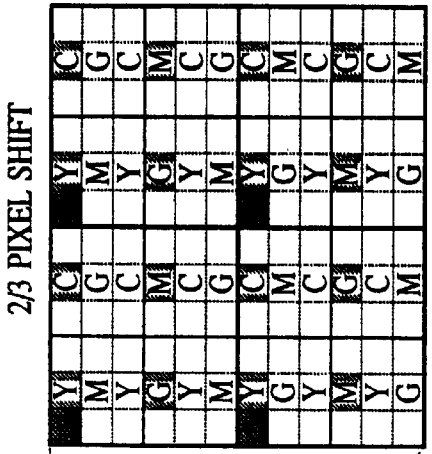
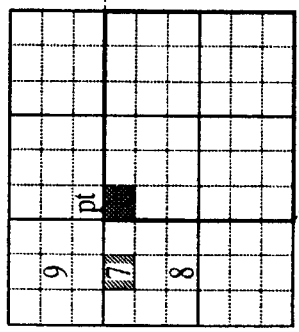
FIG. 11A
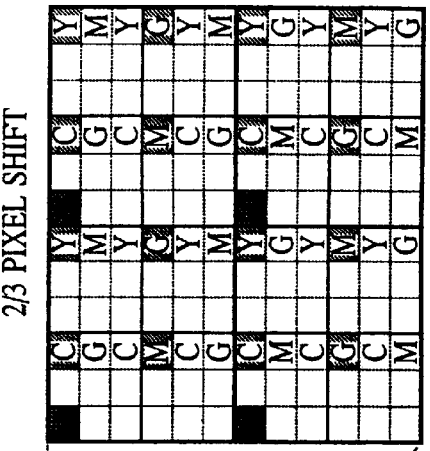
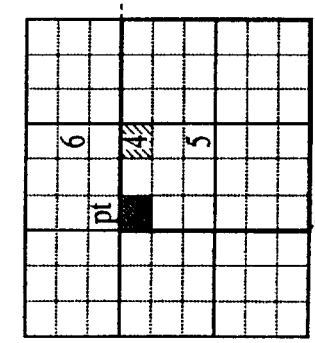
FIG. 11B
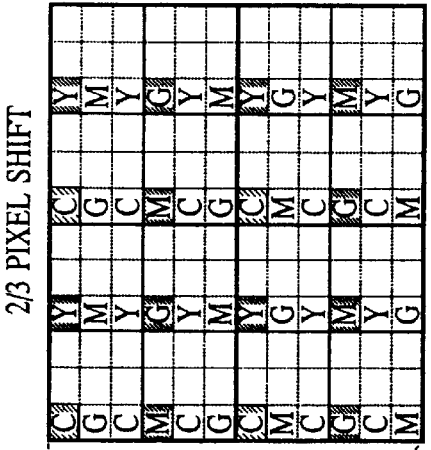
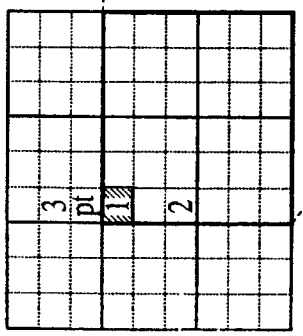
FIG. 11C

IMAGE DATA IN MEMORY

FIG. 12

FILTER ARRANGEMENT OF IMAGING DEVICE (COMPLEMENTARY, STAGGERED)

| | | | | Field |
|---|---|---|---|---|
| C | Y | C | Y | 1 |
| G | M | G | M | 2 |
| C | Y | C | Y | 1 |
| M | G | M | G | 2 |

| C | Y | C | Y | C | Y | C | Y | C | Y |
|---|---|---|---|---|---|---|---|---|---|
| G | M | G | M | G | M | G | M | G | M |
| C | Y | C | Y | C | Y | C | Y | C | Y |
| M | G | M | G | M | G | M | G | M | G |
| C | Y | C | Y | C | Y | C | Y | C | Y |
| G | M | G | M | G | M | G | M | G | M |
| C | Y | C | Y | C | Y | C | Y | C | Y |
| M | G | M | G | M | G | M | G | M | G |
| C | Y | C | Y | C | Y | C | Y | C | Y |
| G | M | G | M | G | M | G | M | G | M |
| C | Y | C | Y | C | Y | C | Y | C | Y |
| M | G | M | G | M | G | M | G | M | G |

FIG. 13

| pt | Filter | Field | X | X | Y |
|---|---|---|---|---|---|
| 1 | CY | 1 | 0 | 0 | 0 |
|   | GM | 2 | 1/3 | 0 | 0 |
| 2 | CY | 1 | 0 | 0 | 2/3 |
|   | GM | 2 | 0 | 0 | 2/3 |
| 3 | CY | 1 | 0 | 0 | -2/3 |
|   | GM | 2 | 0 | 0 | -2/3 |
| 4 | CY | 1 | 0 | 2/3 | 0 |
|   | GM | 2 | 1/3 | 2/3 | 0 |
| 5 | CY | 1 | 0 | 2/3 | 2/3 |
|   | GM | 2 | 0 | 2/3 | 2/3 |
| 6 | CY | 1 | 0 | 2/3 | -2/3 |
|   | GM | 2 | 0 | 2/3 | -2/3 |
| 7 | CY | 1 | 0 | -2/3 | 0 |
|   | GM | 2 | 1/3 | -2/3 | 0 |
| 8 | CY | 1 | 0 | -2/3 | 2/3 |
|   | GM | 2 | 0 | -2/3 | 2/3 |
| 9 | CY | 1 | 0 | -2/3 | -2/3 |
|   | GM | 2 | 0 | -2/3 | -2/3 |

FIG. 14

| pt | Filter | Field | X | X | Y |
|---|---|---|---|---|---|
| 1 | CY | 1 | 0 | 0 | 0 |
|   | GM | 2 | 1 | 0 | 0 |
| 2 | CY | 1 | 0 | 0 | 2/3 |
|   | GM | 2 | 0 | 0 | 2/3 |
| 3 | CY | 1 | 0 | 0 | -2/3 |
|   | GM | 2 | 0 | 0 | -2/3 |
| 4 | CY | 1 | 0 | 2/3 | 0 |
|   | GM | 2 | 1 | 2/3 | 0 |
| 5 | CY | 1 | 0 | 2/3 | 2/3 |
|   | GM | 2 | 0 | 2/3 | 2/3 |
| 6 | CY | 1 | 0 | 2/3 | -2/3 |
|   | GM | 2 | 0 | 2/3 | -2/3 |
| 7 | CY | 1 | 0 | -2/3 | 0 |
|   | GM | 2 | 1 | -2/3 | 0 |
| 8 | CY | 1 | 0 | -2/3 | 2/3 |
|   | GM | 2 | 0 | -2/3 | 2/3 |
| 9 | CY | 1 | 0 | -2/3 | -2/3 |
|   | GM | 2 | 0 | -2/3 | -2/3 |

FIG. 15

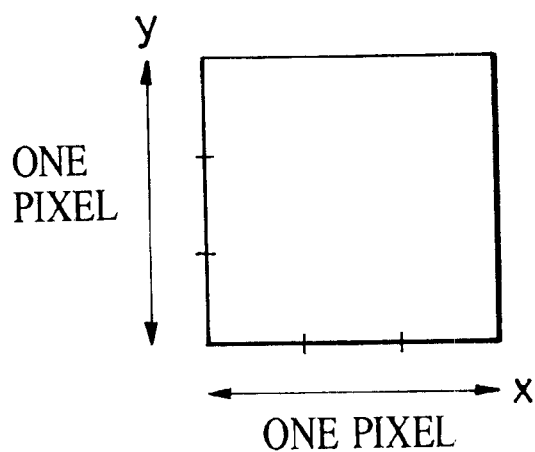
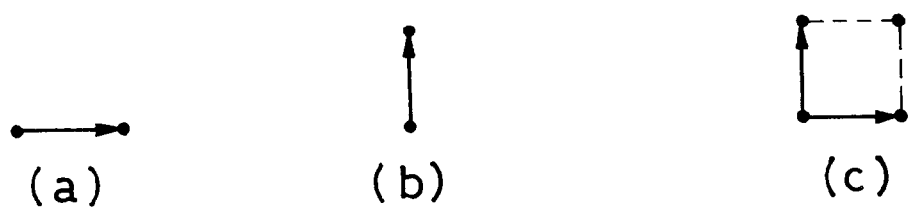
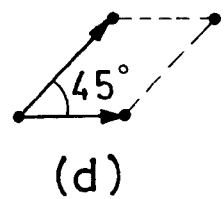
FIG. 18

FIG. 22
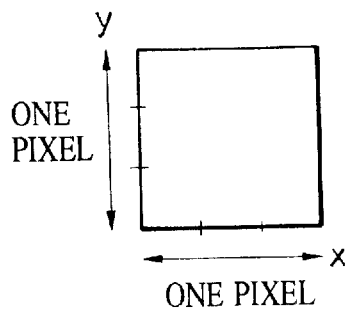
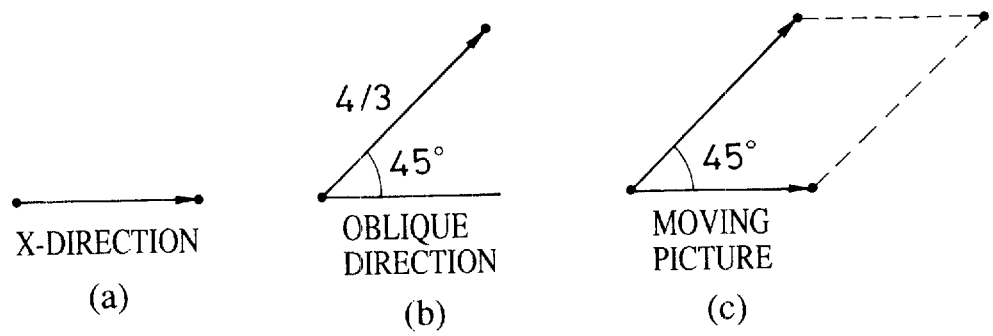
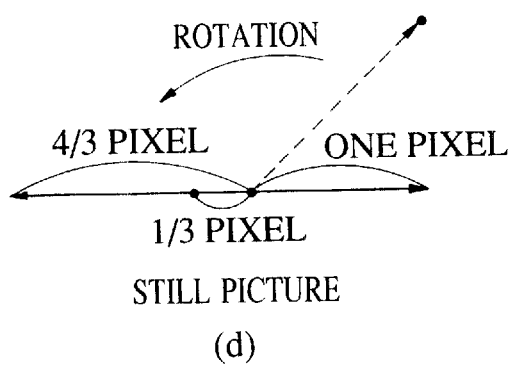
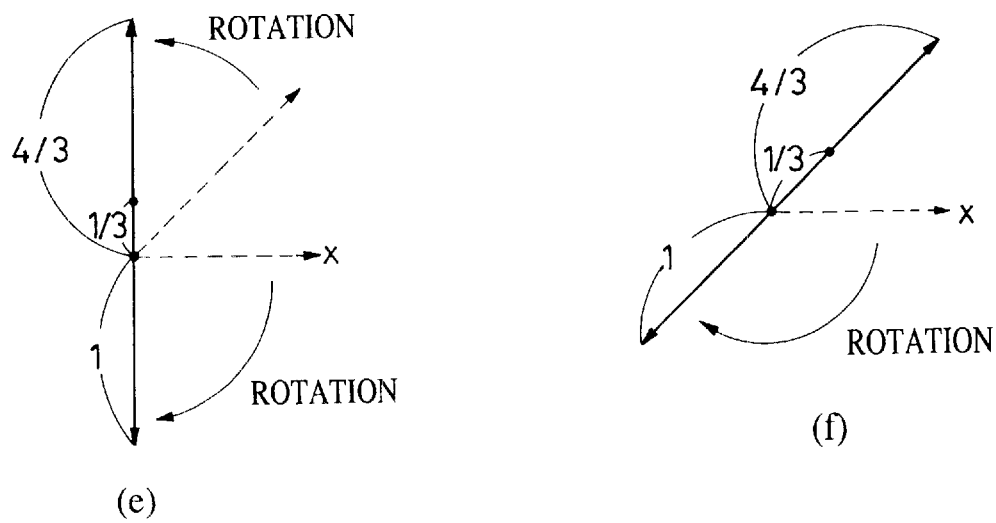

FILTER ARRANGEMENT OF IMAGING DEVICE (RGB BAYER)

Field

| R | G | R | G | 1 |
| G | B | G | B | 2 |
| R | G | R | G | 1 |
| G | B | G | B | 2 |

FIG. 25

FILTER ARRANGEMENT OF IMAGING DEVICE (COMPLEMENTARY, STAGGERED)

Field

| C | Y | C | Y | 1 |
| G | M | G | M | 2 |
| C | Y | C | Y | 1 |
| M | G | M | G | 2 |

FIG. 26

X-DIRECTION

| (1) (3)<br>(2) (4) | (9) (11)<br>(10) (12) |
| (5) (7)<br>(6) (8) | (13) (15)<br>(14) (16) |

Y-DIRECTION

FIG. 27

IMAGE DATA UPON 1/2 PIXEL SHIFT (RGB BAYER)

FIG. 28A  1/2 PIXEL SHIFT

FIG. 28B  ONE PIXEL SHIFT

FIG. 28C  ONE PIXEL SHIFT

FIG. 28D  ONE PIXEL SHIFT

IMAGE DATA AFTER ADDRESS CONVERSION

IMAGE DATA UPON 1/2 PIXEL SHIFT (COMPLEMENTARY, STAGGERED)

IMAGE DATA AFTER ADDRESS CONVERSION

| pt | Field | X | Y |
|---|---|---|---|
| 1 | 1 | 0 | 0 |
|   | 2 | 0 | 0 |
| 2 | 1 | 0 | 1/2 |
|   | 2 | 0 | 1/2 |
| 3 | 1 | 1/2 | 0 |
|   | 2 | 1/2 | 0 |
| 4 | 1 | 1/2 | 1/2 |
|   | 2 | 1/2 | 1/2 |
| pt | Field | X | Y |
| 5 | 1 | 0 | 1 |
|   | 2 | 0 | 1 |
| 6 | 1 | 0 | 3/2 |
|   | 2 | 0 | 3/2 |
| 7 | 1 | 1/2 | 1 |
|   | 2 | 1/2 | 1 |
| 8 | 1 | 1/2 | 3/2 |
|   | 2 | 1/2 | 3/2 |
| pt | Field | X | Y |
| 9 | 1 | 1 | 0 |
|   | 2 | 1 | 0 |
| 10 | 1 | 1 | 1/2 |
|    | 2 | 1 | 1/2 |
| 11 | 1 | 3/2 | 0 |
|    | 2 | 3/2 | 0 |
| 12 | 1 | 3/2 | 1/2 |
|    | 2 | 3/2 | 1/2 |
| pt | Field | X | Y |
| 13 | 1 | 1 | 1 |
|    | 2 | 1 | 1 |
| 14 | 1 | 1 | 3/2 |
|    | 2 | 1 | 3/2 |
| 15 | 1 | 3/2 | 1 |
|    | 2 | 3/2 | 1 |
| 16 | 1 | 3/2 | 3/2 |
|    | 2 | 3/2 | 3/2 |

→ X-DIRECTION

↓ Y-DIRECTION

FIG. 32

|  |  |
|---|---|
| (1) (4) (7)<br>(2) (5) (8)<br>(3) (6) (9) | (19) (22) (25)<br>(20) (23) (26)<br>(21) (24) (27) |
| (10) (13) (16)<br>(11) (14) (17)<br>(12) (15) (18) | (28) (31) (34)<br>(29) (32) (35)<br>(30) (33) (36) |

X-DIRECTION

Y-DIRECTION

FIG. 33

IMAGE DATA UPON 1/3 PIXEL SHIFT (RGB BAYER)

IMAGE DATA AFTER ADDRESS CONVERSION

IMAGE DATA UPON 1/3 PIXEL SHIFT (COMPLEMENTARY, STAGGERED)

IMAGE DATA AFTER ADDRESS CONVERSION

| pt | Field | X | Y |
|---|---|---|---|
| 1 | 1 | 0 | 0 |
|  | 2 | 0 | 0 |
| 2 | 1 | 0 | 1/3 |
|  | 2 | 0 | 1/3 |
| 3 | 1 | 0 | 2/3 |
|  | 2 | 0 | 2/3 |
| 4 | 1 | 1/3 | 0 |
|  | 2 | 1/3 | 0 |
| 5 | 1 | 1/3 | 1/3 |
|  | 2 | 1/3 | 1/3 |
| 6 | 1 | 1/3 | 2/3 |
|  | 2 | 1/3 | 2/3 |
| 7 | 1 | 2/3 | 0 |
|  | 2 | 2/3 | 0 |
| 8 | 1 | 2/3 | 1/3 |
|  | 2 | 2/3 | 1/3 |
| 9 | 1 | 2/3 | 2/3 |
|  | 2 | 2/3 | 2/3 |

| pt | Field | X | Y |
|---|---|---|---|
| 10 | 1 | 0 | 1 |
|  | 2 | 0 | 1 |
| 11 | 1 | 0 | 4/3 |
|  | 2 | 0 | 4/3 |
| 12 | 1 | 0 | 5/3 |
|  | 2 | 0 | 5/3 |
| 13 | 1 | 1/3 | 1 |
|  | 2 | 1/3 | 1 |
| 14 | 1 | 1/3 | 4/3 |
|  | 2 | 1/3 | 4/3 |
| 15 | 1 | 1/3 | 5/3 |
|  | 2 | 1/3 | 5/3 |
| 16 | 1 | 2/3 | 1 |
|  | 2 | 2/3 | 1 |
| 17 | 1 | 2/3 | 4/3 |
|  | 2 | 2/3 | 4/3 |
| 18 | 1 | 2/3 | 5/3 |
|  | 2 | 2/3 | 5/3 |

| pt | Field | X | Y |
|---|---|---|---|
| 19 | 1 | 1 | 0 |
|  | 2 | 1 | 0 |
| 20 | 1 | 1 | 1/3 |
|  | 2 | 1 | 1/3 |
| 21 | 1 | 1 | 2/3 |
|  | 2 | 1 | 2/3 |
| 22 | 1 | 4/3 | 0 |
|  | 2 | 4/3 | 0 |
| 23 | 1 | 4/3 | 1/3 |
|  | 2 | 4/3 | 1/3 |
| 24 | 1 | 4/3 | 2/3 |
|  | 2 | 4/3 | 2/3 |
| 25 | 1 | 5/3 | 0 |
|  | 2 | 5/3 | 0 |
| 26 | 1 | 5/3 | 1/3 |
|  | 2 | 5/3 | 1/3 |
| 27 | 1 | 5/3 | 2/3 |
|  | 2 | 5/3 | 2/3 |

| pt | Field | X | Y |
|---|---|---|---|
| 28 | 1 | 1 | 1 |
|  | 2 | 1 | 1 |
| 29 | 1 | 1 | 4/3 |
|  | 2 | 1 | 4/3 |
| 30 | 1 | 1 | 5/3 |
|  | 2 | 1 | 5/3 |
| 31 | 1 | 4/3 | 1 |
|  | 2 | 4/3 | 1 |
| 32 | 1 | 4/3 | 4/3 |
|  | 2 | 4/3 | 4/3 |
| 33 | 1 | 4/3 | 5/3 |
|  | 2 | 4/3 | 5/3 |
| 34 | 1 | 5/3 | 1 |
|  | 2 | 5/3 | 1 |
| 35 | 1 | 5/3 | 4/3 |
|  | 2 | 5/3 | 4/3 |
| 36 | 1 | 5/3 | 5/3 |
|  | 2 | 5/3 | 5/3 |

X-DIRECTION

Y-DIRECTION

FIG. 38

HIGH RESOLUTION STILL-IMAGE CAPTURE APPARATUS THAT SHIFTS PIXELS BY PLUS OR MINUS TWO-THIRDS PIXEL PITCH

BACKGROUND OF THE INVENTION

1. Field of the Invention

The present invention relates to an image pickup apparatus which offers high quality of images by using a technique referred to as "pixel shift".

2. Description of the Related Art

In recent years, there is an increasing demand for image inputting apparatuses, due to rapid spreading of use of personal computers (PCs).

Typically, scanners are used as the image inputting apparatuses for use in combination with PCs. Such scanners are basically intended to pickup image information written or printed on sheets of paper or the like, such as written or printed texts, photographs and so on.

Scanners employ line sensors as imaging means, and cover a wide range of resolution from 200 dpi (dots per inch) up to very high resolution of 1200 dpi.

In general, sufficient legibility and readability of 10-point fonts of a written or printed text is considered as criteria for the image resolution in practical applications. To meet this requirement, the image inputting apparatuses have to pickup and form images at a resolution which is at least 200 dpi. Thus, the scanners satisfy this requirement insofar as the image resolution is concerned.

In the meantime, image inputting apparatuses relying upon video techniques are also available, a typical example of which is a visualizer which also is known as "document camera." Many visualizers have been proposed and are actually available as commercial products.

In most cases, a visualizer has an illuminated platen for carrying an original document, and a video camera which is supported on the platen and which picks up the image of the original document.

Such a visualizer employs an area sensor as the imaging means. The image resolution obtainable with this type of apparatus is limited by the resolution achievable by the video camera. In general, a video camera can provide only low levels of image resolution. For instance, the image resolution is about 67 dpi at the highest, when the video camera is used for reading a full A-4 size text which is laid with its longer side extending from left to right. More specifically, the pixel pitch along the longer side of the A-4 size text is calculated as 640/9.5=67.4 (dpi) at the aspect ratio of 1:1 when the video camera follows NTSC specifications.

Referring again to scanners, one of the problems encountered with this type of image inputting apparatus is excessively long scanning time. In fact, it takes about 10 to 20 seconds to scan a color image. Another problem is that the whole image, i.e., the overall framing, cannot be grasped until the entire original image is scanned.

Apparatuses having a preview mode has been proposed, in order to obviate the second-mentioned problem, i.e., inability to grasp the overall framing before completion of scanning. Such apparatuses, however, are not easy to operate, due to necessity of certain steps, including previewing and subsequent pointing of the scanning area by a pointing device such as a mouse.

A fundamental problem encountered with the use of scanners is that the scanners cannot pickup images of three-dimensional objects. In other words, the scanners are effectively used only for reading texts and pictures.

In contrast, video visualizers are easy to use and can pickup images of three-dimensional objects while offering easy framing, thus obviating the problems encountered with the scanners, but are still unsatisfactory as they cannot satisfy requirements in regard to image resolution.

It is true that video visualizers can provide only low levels of resolution, e.g., 67 dpi at the highest, failing to meet the demand for higher image quality, as described before. Such video visualizers, on the other hand, offer a remarkable advantage, by virtue of use of a zooming function. More specifically, the user can control and determine the framing in real time by changing the zooming ratio and moving the original document on the platen while monitoring the image through a display.

It is therefore highly desirable that a video visualizer has a high level of resolution that compares well with that achieved by scanners. Such a video visualizer will make it possible to obtain high-quality images not only from texts or pictures but also from three-dimensional objects.

One of the measures for implementing such an image pickup apparatus would be to increase the number of pixels in the area sensor used in a video visualizer. The area sensors used in existing video visualizers have 410,000 pixels in total, among which 380,000 are effective, in order to satisfy the requirement for resolution corresponding to 450 TV lines. In the meantime, high-quality image sensors intended for use in digital still cameras have been proposed in recent years. These sensors have very large numbers of pixels, e.g., 1,000,000 pixels, 1,300,000 pixels or 1,600,000 pixels. It might be possible to substitute such a high-quality image sensor for a conventional area sensor in a video visualizer, in order to achieve the desired high level of resolution.

Such high-quality image sensors, however, have large chip sizes and, hence, are generally expensive. An attempt to enhance the scale of integration through reduction of pixel size is not considered promising, because such higher scale of integration poses other problems such as impairment of S/N ratio due to reduction in the sensitivity.

Moreover, it is to be pointed out that these high-quality image sensors are still unsatisfactory because they cannot provide image resolution equivalent to that offered by scanners. More specifically, the resolution is as low as 100 dpi when the area sensor having 1,000,000 pixels is used for reading a text of A-4 size. Similarly, the resolution is still as low as 135 dpi, when the area sensor having 1,350,000 pixels is used for reading A-4 size text and, even when an area sensor having 1,600,000 pixels is used, the resolution obtainable is still 135 dpi after conversion into image having the aspect ratio of 1:1. Such resolutions are much lower than 200 dpi easily achievable by a scanner having comparatively low resolution.

Furthermore, the video visualizer incorporating such a high-quality image sensor is required to produce analog video output in accordance with, for example, NTSC specifications, in order to attain compatibility with existing video visualizers. The analog video output is preferably of an image quality on the order of 410,000 in terms of pixel number (380,000 effective pixels). However, the above-mentioned high-quality image sensor, due to its specific pixel arrangement, lacks any output mode which would enable conversion of its output to the 410,000-pixel video rate. In order to implement such an output mode, it is necessary to additionally incorporate a scan rate converting circuit, with the result that the production cost is raised undesirably.

In addition, as is well known, the scan rate conversion itself is a factor which degrades the image quality, because it produces unnatural minute steps or jags at the edges of image. Therefore, even when the scan rate for the output of the high-quality image sensor could be converted to that corresponding to 410,000 pixels, the image quality obtained with such a high-quality image sensor is inevitably inferior to the quality of image derived from the conventional sensor having 410,000 pixels, due to the presence of minute steps or jags on the edges of images.

In order to obviate this problem, a method generally referred to as "pixel shift" has been proposed in which the position of the imaging device relative to the incident light is shifted stepwise at a pitch which is a fraction (1/N) of the pixel number, thereby improving the image resolution.

More specifically, the pixel shift can be realized by using a plane-parallel light transmissive glass plate disposed in the optical path at a location between the image pickup lens and the imaging device. The light-transmissive glass plate is rotated by a predetermined amount, so that the light rays carrying optical image information, which otherwise would impinge upon insensitive zones between the pixels, can be received by the pixels, thus enhancing the image resolution.

The pixel shift can be implemented also by effecting a minute shift of the imaging device itself. This method, however, is not practical because of the difficulty encountered in achieving required level of precision of the position control.

The use of the pixel shift technique makes it possible to pickup images at high level of quality without requiring greater number of pixels, by virtue of the effect produced by the plane-parallel glass plate. This technique, therefore, has been appreciated as being a very effective measure for achieving high image quality.

The pixel-shift technique also makes it possible to easily obtain analog video signal simultaneously by using, as the imaging device, a 410,000-pixel video sensor.

However, the following problems are encountered in implementing a visualizer having image resolution on the order of 200 dpi by using the conventional pixel-shift technique.

Assuming the simplest form of the pixel shift in which the pitch of the shift is ½ the pixel pitch, the resolution cannot be increased beyond double of the original resolution. For instance, when the visualizer is used for reading full text on an A-4 paper which is laid with its longer side extending from the right to the left, the maximum resolution is 135 dpi (67×2).

This level of resolution is insufficient for picking up images of 10-point fonts on a paper sheet. In addition, picking up of colored image requires an image memory having 16 frames, which raises the cost uneconomically.

Furthermore, color signal processings such as white-balance processing has to be conducted on an externally connected PC, requiring a long processing time which is usually from 10 to 20 seconds.

In addition, a computation is necessary for generating monochromatic signal, because of the use of primary color filters, regardless of whether the filters are pure color filters or complementary color filters. Such computation also has to be conducted by the external PC, further prolonging the processing time.

The minimum required resolution level of 200 dpi is obtainable if the pitch of the pixel shift is set to be ⅓ pixel pitch. In such a case, however, an image memory having 36 frames is required, resulting in a rise of the cost as in the case of the pixel shift by ½ pixel pitch. Processing time is prolonged also in this case, due to necessity of color signal processing such as white balancing.

Furthermore, regardless of the pitch of the pixel shift, it is necessary to employ a signal processing circuit which processes video signals obtained as a result of the pixel-shifting operation and which is incompatible with ordinary signal processing circuit. Thus, an exclusive signal processing circuit is required or the external PC is burdened if the signal processing is performed on the PC.

As an example of diversification of functions of visualizers, an apparatus has been proposed in which the posture of the image pickup unit is variable to enable pickup of image of a moving object rather than original texts. This type of apparatus must have separate and independent signal processing systems, one for picking up moving image and one for picking up still images at high resolution through pixel shifting. This type of apparatus, therefore, is not easy to implement, due to reasons such as large scale of system structure, rise of the cost, long processing time, and so forth.

SUMMARY OF THE INVENTION

Accordingly, an object of the present invention is to provide an image pickup apparatus which offers, by virtue of use of a pixel-shift technique, various advantages such as high quality of output image, high processing efficiency, high speed of operation and high efficiency of use of memory.

Another object of the present invention is to provide an image pickup apparatus relying upon a pixel-shift technique, improved to enable an existing camera processing circuit to process image data picked up through the pixel-shifting operation, thereby offering higher signal processing efficiency and higher efficiency of use of memory, as well as higher operation speed.

To these ends, according to one aspect of the present invention, there is provided a image pickup apparatus, comprising: pixel-shifting means for shifting a light beam impinging upon the imaging surface of an imaging device at a shifting pitch corresponding to a predetermined number of pixels; an image memory for storing pixel data obtained at each of the positions to which the light beam has been shifted by the pixel-shifting means; and a memory controller for causing the image memory to store the pixel data in a spatial arrangement equivalent to the pixel data obtained by an imaginary imaging device having pixels of a number N (N being an integer) times as large as that of the imaging device in each of the line and column directions, and for dividing the stored pixel data into frames to enable reading of the stored pixel data in a plurality of times on a frame basis.

According to another aspect of the present invention, there is provided an image pickup apparatus, comprising: an imaging device which enables reading of pixel data both in a frame reading mode in which data of all the pixels are read and a field reading mode in which pixel data from a plurality of lines of pixels in a mixed manner; a camera process circuit for processing pixel data read from the imaging device in the plural-line-mixed field reading mode; pixel-shifting means for shifting a light beam impinging upon the imaging surface of an imaging device at a shifting pitch corresponding to a predetermined number of pixels; an image memory for storing pixel data read from the imaging device; a memory controller for causing, when the pixel data read from the imaging device in the frame reading mode are written in the image memory, the image memory to store the pixel data in a spatial arrangement equivalent to the pixel data obtained by an imaginary imaging device having pixels of a number N (N being an integer) times as large as that of the imaging device in each of the line and column directions, and for dividing the stored pixel data into frames to enable reading of the stored pixel data in a plurality of times on a frame basis; and camera processing means for processing field-read pixel data obtained through a computation for mixing pixel data of a plurality of lines performed on the pixel data read by the memory controller from the image memory.

The invention also provides in its further aspect an image pickup apparatus, comprising: an imaging device provided with a color filter having a regular arrangement formed by repetition of an 8-pixel unit block having two pixels in the line direction and 4 pixels in the column direction; pixel-shifting means operative to shift a light beam impinging upon the imaging surface of the imaging device by an amount corresponding to ⅔ pixel pitch both in plus and minus directions: A/D converter means for converting the pixel data accumulated on the imaging device into digital data; an image memory capable of storing at least 9 frames of digital pixel data outputted from the A/D converter means; a memory controller for arranging the pixel data to be written in the image memory in a spatial arrangement equivalent to the pixel data obtained by an imaginary imaging device having pixels of a number three times as large as that of the imaging device in each of line and column directions; an adder circuit which performs a computation for mixing pixel data of a plurality of pixel lines read from the image memory; and camera process means for processing the plural-line-mixed field-read pixel data outputted from the adder circuit.

A third object of the present invention is to provide an image pickup apparatus incorporating a low-pass filter control suitable for use in the image pickup operation relying on pixel-shifting technique.

Further objects, features and advantages of the present invention will become apparent from the following description of the preferred embodiments with reference to the attached drawings.

BRIEF DESCRIPTION OF THE DRAWINGS

FIGS. 4A to 4C are illustrations of a pixel shift by ⅔ pixel pitch;

FIG. 5 is an illustration of pixel data stored in an image memory through the ⅔ pixel-pitch shifting operation;

FIGS. 6A and 6B are illustrations of a control algorithm for ⅔ pixel-pitch shifting means;

FIGS. 7A and 7B are illustrations of an RGB Bayer color filter arrangement and a pixel arrangement of higher density obtained through a pixel-shifting operation, i.e., pixel arrangement obtained through an address conversion;

FIGS. 8A to 8C are illustrations of a pixel shift by ⅔ pixel pitch;

FIGS. 11A to 11C are illustrations of operation performed by another correcting means which corrects pixel arrangement after the pixel-shifting operation;

FIG. 12 is an illustration of the final arrangement of pixel data in a memory, based on the pixel data obtained through a pixel-shifting operation;

FIG. 13 is an illustration of pixel data as obtained through an address conversion effected on the pixel data of FIG. 12;

FIG. 14 is an illustration of a correcting operation performed by a pixel shift by an amount corresponding to ⅓ pixel pitch;

FIG. 15 is an illustration of a correcting operation performed by a pixel shift by an amount corresponding to one pixel pitch;

FIG. 18 is an illustration of characteristics of an optical low-pass filter;

FIG. 22 is an illustration of a different operation of the optical low-pass filter and change in the characteristic of the same;

FIG. 25 is an illustration of an RGB Bayer color filter arrangement, explanatory of the principle of the pixel-shift technique;

FIG. 26 is an illustration of a staggered complementary-color filter arrangement, explanatory of the principle of the pixel-shift technique;

FIG. 27 is an illustration of the algorithm of pixel shift by ½ pixel pitch;

FIGS. 28A to 28D are illustrations of pixel data obtained as a result of a pixel shift by ½ pixel pitch, for optical information obtained through the RGB Bayer color filter arrangement;

Figures 29A, 29B, 29C, 29D:
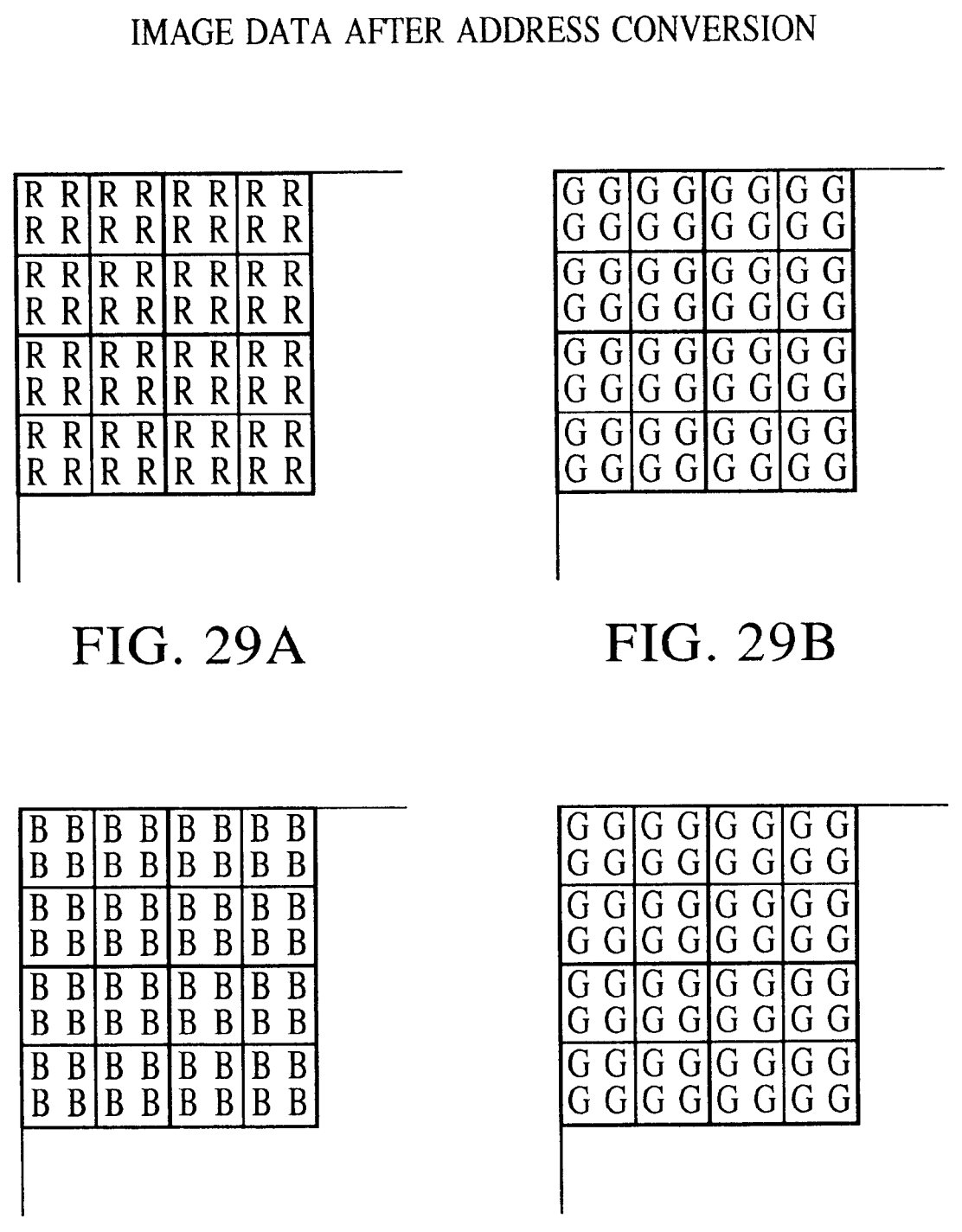

FIGS. 29A to 29D are illustrations of image data as obtained through an address conversion effected on the data shown in FIGS. 28A to 28D;

FIGS. 30A to 30D are illustrations of pixel data obtained as a result of a pixel shift by ½ pixel pitch, for optical information obtained through the staggered complementary-color filter arrangement;

Figures 31A, 31B, 31C, 31D:
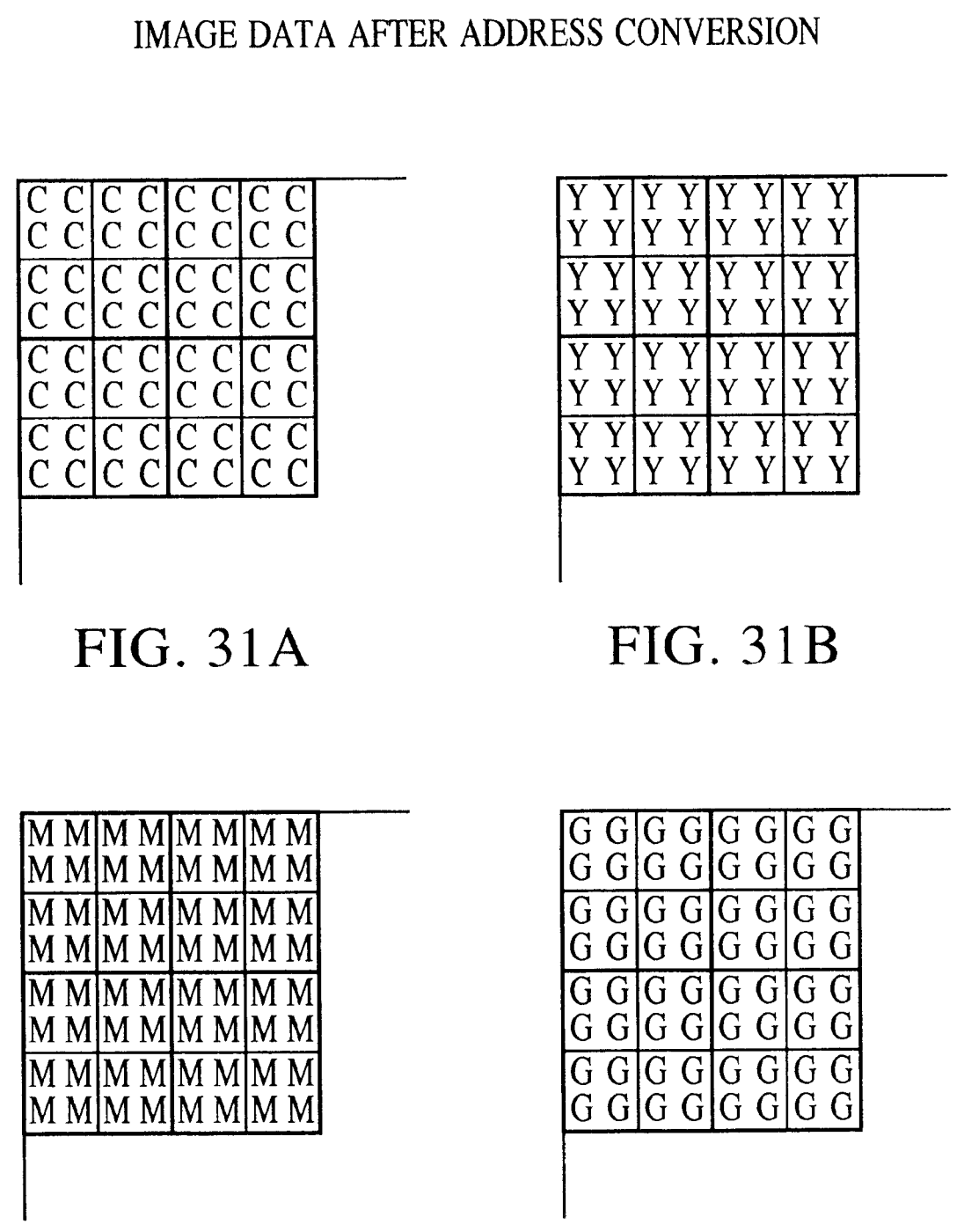

FIGS. 31A to 31D are illustrations of image data as obtained through an address conversion effected on the data shown in FIGS. 30A to 30D;

FIG. 32 is an illustration of a control algorithm for the pixel-shifting means which performs pixel shift by ½ pixel pitch;

FIG. 33 is an illustration of the algorithm for the pixel shift by ⅓ pixel pitch;

FIGS. 34A to 34D are illustrations of pixel data obtained as a result of a pixel shift by ⅓ pixel pitch, for optical information obtained through the RGB Bayer color filter arrangement;

FIGS. 35A to 35D are illustrations of image data as obtained through an address conversion effected on the data shown in FIGS. 34A to 34D;

FIGS. 36A to 36D are illustrations of pixel data obtained as a result of a pixel shift by ⅓ pixel pitch, for optical information obtained through the staggered complementary-color filter arrangement;

Figures 37A, 37B, 37C, 37D:
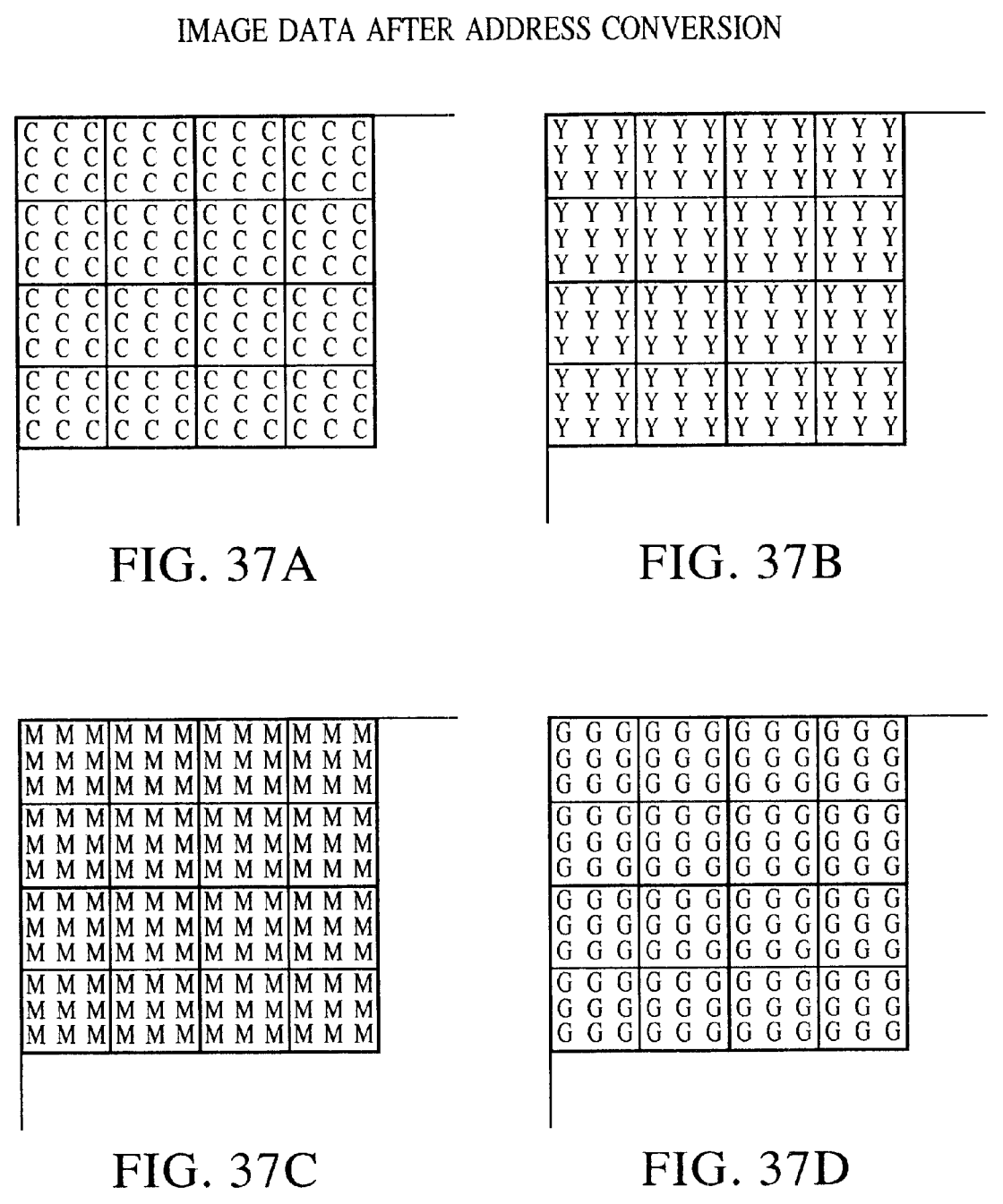

FIGS. 37A to 37D are illustrations of image data as obtained through an address conversion effected on the data shown in FIGS. 36A to 36D; and FIG. 38 is an illustration of a control algorithm for the pixel-shifting means which performs pixel shift by ⅓ pixel pitch.

DESCRIPTION OF THE PREFERRED EMBODIMENTS

Figure 1:
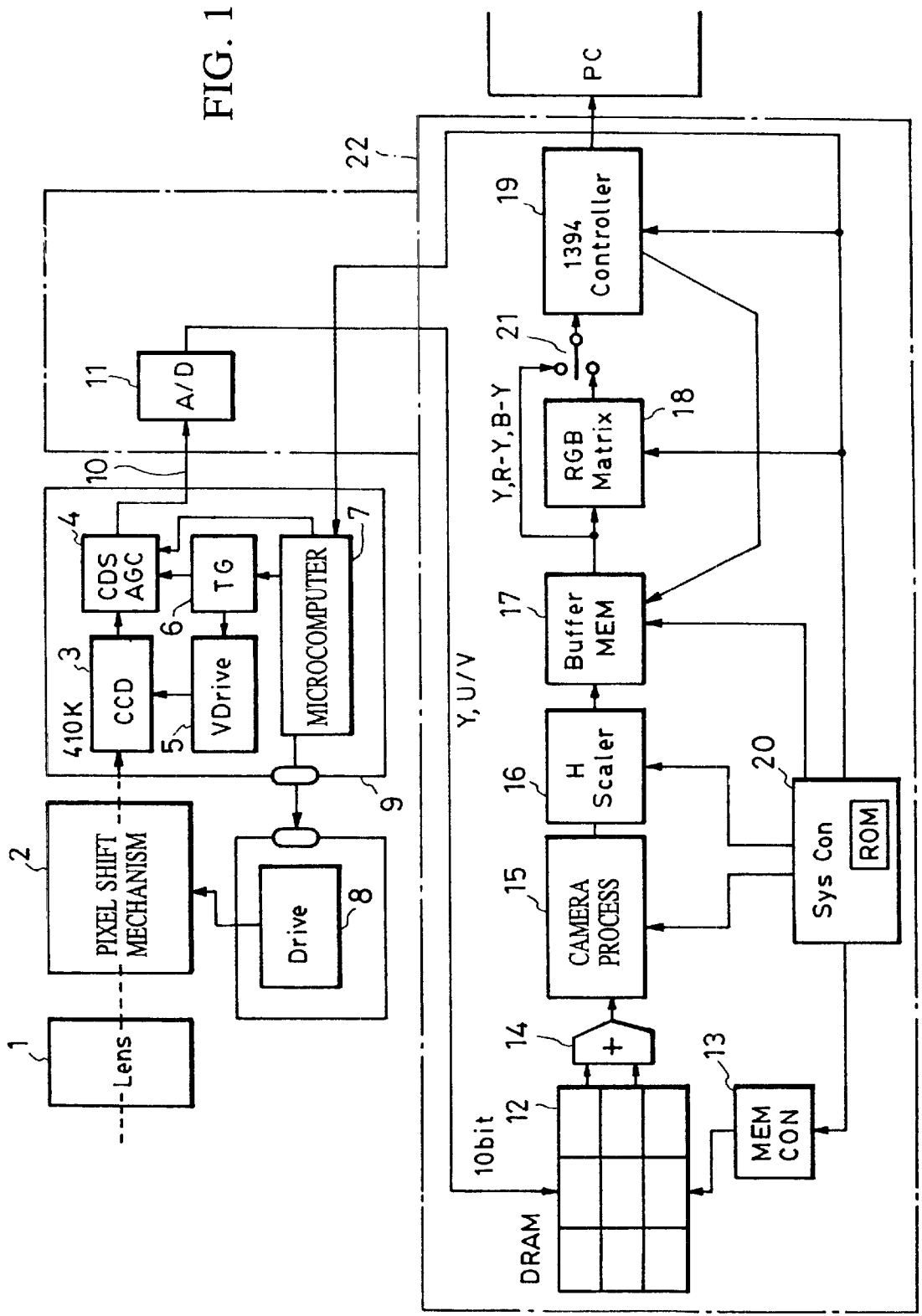
FIG. 1 is a block diagram of a first embodiment of an image pickup apparatus in accordance with the present invention.

Preferred embodiments of the present invention will now be described with reference to the accompanying drawings. Various techniques and methods have been proposed for improving resolution by effecting a pixel shift either in horizontal or vertical direction. Before turning to the description of the embodiments, therefore, an explanation will be given of the principle and basic form of the pixel-shifting operation.

A color filter is disposed on the image incoming side of the imaging device. The color filter has pixel arrangement which is in most cases either an "RGB Bayer arrangement" or a "staggered complementary-color arrangement." The following explanation proceeds on assumptions that pixel shift by a distance amounting to ½ pixel pitch is effected for the purpose of enhancing the resolution of images picked up by imaging devices through such filters.

FIG. 25 shows color filters in accordance with the RGB Bayer arrangement, while FIG. 26 shows color filters of the staggered-complementary arrangement. The arrangement is such that element cells of the color filters are arranged on the pixels of a single solid state imaging device in 1:1 fashion.

FIG. 27 shows the direction and amount of pixel shift performed on the RGB Bayer arrangement having 16 pixels as shown in FIG. 25. More specifically, FIG. 27 shows relative movements of pixel positions when a pixel shift by amount corresponding to ½ pixel pitch is effected in each the horizontal direction (X-direction) and the vertical direction (Y-direction), from an arbitrarily determined reference position. For instance, in the RGB Bayer arrangement shown in FIG. 25, the position of "R" at the left upper corner of the pixel matrix is used as the reference position.

To explain in more detail, a pattern composed of 16 pixels is divided into four blocks. FIG. 27 shows the manner in which the pixel shift by the amount corresponding to ½ pixel pitch is performed for each of these four blocks. Numerals appearing in each block show the direction and sequence of the pixel shift in that block.

For instance, referring to the left upper block, numeral (1) indicates the reference position of the 16-pixel arrangement, (2) indicates a pixel shift operation by the amount corresponding to ½ pixel pitch in the Y-direction, (3) indicates a pixel shift operation by the amount corresponding to ½ pixel pitch in the X-direction, and (4) indicates a pixel shift operation by the amount corresponding to ½ pixel pitch, both in the X- and Y-directions.

Thus, the numerals (1), (2), (3) and (4) indicate the manner in which image is picked up through pixel-shifting operations performed both in the horizontal and vertical directions by the amount corresponding to ½ pixel pitch, with respect to the reference position (1).

Referring now to the left lower block, numerals (6), (7) and (8) indicate positions after the pixel-shifting operations performed in the Y-, X- and X-Y-directions by the amount corresponding to ½ pixel pitch, from a reference position (5) which has been shifted by one pixel pitch in the Y-direction from the aforementioned reference position (1) of the 16-pixel arrangement.

Similarly, referring now to the right upper block, the pixel-shifting operations indicated by (9), (10), (11) and (12) have been performed in the Y-, X- and X-Y-directions by the amount corresponding to ½ pixel pitch as denoted by (10), (11) and (12), respectively, from a reference position (9) which is at a position shifted by one pixel pitch in the X-direction from the aforementioned reference position (1) of the 16-pixel arrangement.

Finally, referring to the right lower block, the pixel-shifting operations indicated by (13), (14), (15) and (16) have been performed in the Y-, X- and X-Y-directions by the amount corresponding to ½ pixel pitch as denoted by (14), (15) and (16), respectively, from a reference position (13) which is at a position shifted both in the X- and Y-directions by one pixel pitch from the aforementioned reference position (1) of the 16-pixel arrangement.

Thus, pixel shift operations are performed by ½ pixel pitch in each of the four blocks which are mutually spaced by one pixel in the X-, Y- and X-Y-directions. Consequently, color signals of different colors are obtained for each of the pixels.

The relationship between the pixels and the color signals will be more clearly understood from the following description taken in conjunction with FIGS. 28A to 28D.

FIGS. 28A to 28D show the pixel data obtained as a result of the pixel shift by ½ pixel pitch for the 16 pixels divided into four blocks.

FIG. 28A corresponds to the upper left block (four pixels) among the blocks shown in FIG. 27. Referring to the left upper block in FIG. 27, when an image is picked up while the ½ pixel-pitch shift operations are performed both in the X- and Y-directions as indicated by (1) to (4), a batch of information corresponding to four pixels can be obtained for each of the pixels shown in FIG. 27. Similarly, a batch of information corresponding to four pixels are obtained through the pixel shift by ½ pixel pitch, for each of other pixels.

More specifically, FIG. 28A shows that a batch of information corresponding to four pixels is obtained for each of the R, G and B pixels, as a result of the pixel shift by ½ pixel pitch.

FIG. 28B corresponds to the four pixels shown at the right upper corner of FIG. 27, and shows that a batch of information corresponding to four pixels is obtained for each of the R, G and B pixels, as a result of the pixel shift by ½ pixel pitch performed as indicated by (9) to (12) at the position shifted by one pixel in the X-direction.

Similarly, FIG. 28C corresponds to the four pixels shown at the left lower corner of FIG. 27, and shows that a batch of information corresponding to four pixels is obtained for each of the R, G and B pixels, as a result of the pixel shift by ½ pixel pitch performed as indicated by (5) to (8) at the position shifted by one pixel in the Y-direction.

Similarly, FIG. 28D corresponds to the four pixels shown at the right lower corner of FIG. 27, and shows that a batch of information corresponding to four pixels is obtained for each of the R, G and B pixels, as a result of the pixel shift by ½ pixel pitch performed as indicated by (13) to (16) at the position shifted by one pixel both in the X- and Y-directions.

If this technique is not used, information corresponding to only one R pixel is available at the reference position (1) shown in FIG. 27. However, when this technique is used, it is possible to obtain R information corresponding to four pixels, G information corresponding to four pixels, and B information corresponding to four pixels.

The R image information, G image information and B image information obtained through the pixel-shift operations as described are stored in R, G and B color signal memories, respectively, and are subjected to address conversion so that color information in each color signal memory is rearranged in X- and Y-directions as shown in FIGS. 29A to 29D. Thus, R image information, G image information and B image information are collected in the respective color signal memories, so that images of the respective colors are formed.

It is thus possible to obtain resolution twice as high as that obtained before the pixel-shifting operations of FIG. 27 can be realized for each of R, G and B pixels, both in the X- and Y-directions. At the same time, pieces of information of different colors are obtained at each pixel position. More specifically, it is possible to obtain color information at 16 locations {four locations (½ pixel-pitch shift at two locations both in X- and Y-directions) multiplied by four locations per color} as a result of the described color shifting operations. Consequently, it is possible to obtain image data which is 16 times as large as that of the number of pixels employed in the imaging device.

In order to implement the described 16-location image shifting operations, it is necessary to shift the light beam impinging upon the imaging surface of the imaging device to four positions of 0, ½, 1 and 3⁄2 in terms of the pixel pitch from the reference position in the X-direction and also to four positions of 0, ½, 1 and 3⁄2 in terms of the pixel pitch from the reference position in the Y-direction, while suitably controlling an operation such as changing the gradient of the plane-parallel plate placed in the optical path of the imaging optical system or minutely vibrating the imaging device itself. FIG. 32 shows the sequence of this control.

FIGS. 30A to 30D and FIGS. 31A to 31D show the manners in which pixel-shifting operations similar to those described above are performed on a staggered complementary-color filter.

Although the pixel arrangement of this filter is different from that of the RGB Bayer filter mentioned before, the pixel-shifting processing on this filter is basically the same as that for the RGB Bayer filter and, therefore, is not described. Thus, only the results of the pixel-shifting operations are shown. Each pixel picks up a batch of information corresponding to four pixels for each of the complementary colors of cyan (C), magenta (M), green (G) and yellow (Y) through pixel-shifting operation by ½ pixel pitch. Another cycle of pixel-shifting operations is performed after the completion of the pixel-shifting operations by one pixel pitch in each and both of the X- and Y-directions, whereby image data 16 times as large as the number of the pixels of the imaging device is obtained.

Image data obtained through the successive pixel-shifting operations are subjected to address conversion and rearranged in respective color signal memories as shown in FIGS. 31A to 31D. Thus, an image is formed in each of the cyan (C), magenta (M), green (G) and yellow (Y) color memories.

In this case also, it is necessary to effect the pixel shift to four positions of 0, ½, 1 and 3⁄2 in terms of the pixel pitch from the reference position in the X-direction and also to four positions of 0, ½, 1 and 3⁄2 in terms of the pixel pitch from the reference position in the Y-direction.

Thus, as a result of the described ½ pixel-pitch shifting operations, resolution of color images is doubled, both in the cases where an RGB Bayer filter and a staggered complementary-color filter are used. More specifically, the resolution is doubled to about 135 dpi (67.4×2≈135).

A description will now be given of pixel-shifting operations which are conducted at a pitch amounting to ⅓ pixel pitch.

Referring to FIG. 33, an RGB Bayer filter is shown to have a pixel matrix composed of 6 pixels arranged in the X-direction and 6 pixels arranged in the Y-direction, thus presenting 36 (6×6=36) pixels. These 36 pixels are divided into four blocks each having 9 pixels arranged in 3 lines (X-direction) and 3 columns (Y-direction). The pixel-shifting is conducted two times, each time by an amount corresponding to ⅓ pixel pitch both in the X- and Y-directions. As a consequence, resolution is enhanced by a factor of three. FIGS. 34A to 34D show the pixel data as obtained through the pixel-shifting operations.

Referring to the 9-pixel block shown at the left upper part of FIG. 33, shifting operation is conducted two times, each time by an amount corresponding to ⅓ pixel pitch, i.e., to positions ⅓ and ⅔ in terms of pixel pitch, starting from the reference pixel position indicated by (1), both in the X- and Y-directions, thereby picking up an image.

Figures 34A, 34B, 34C, 34D:
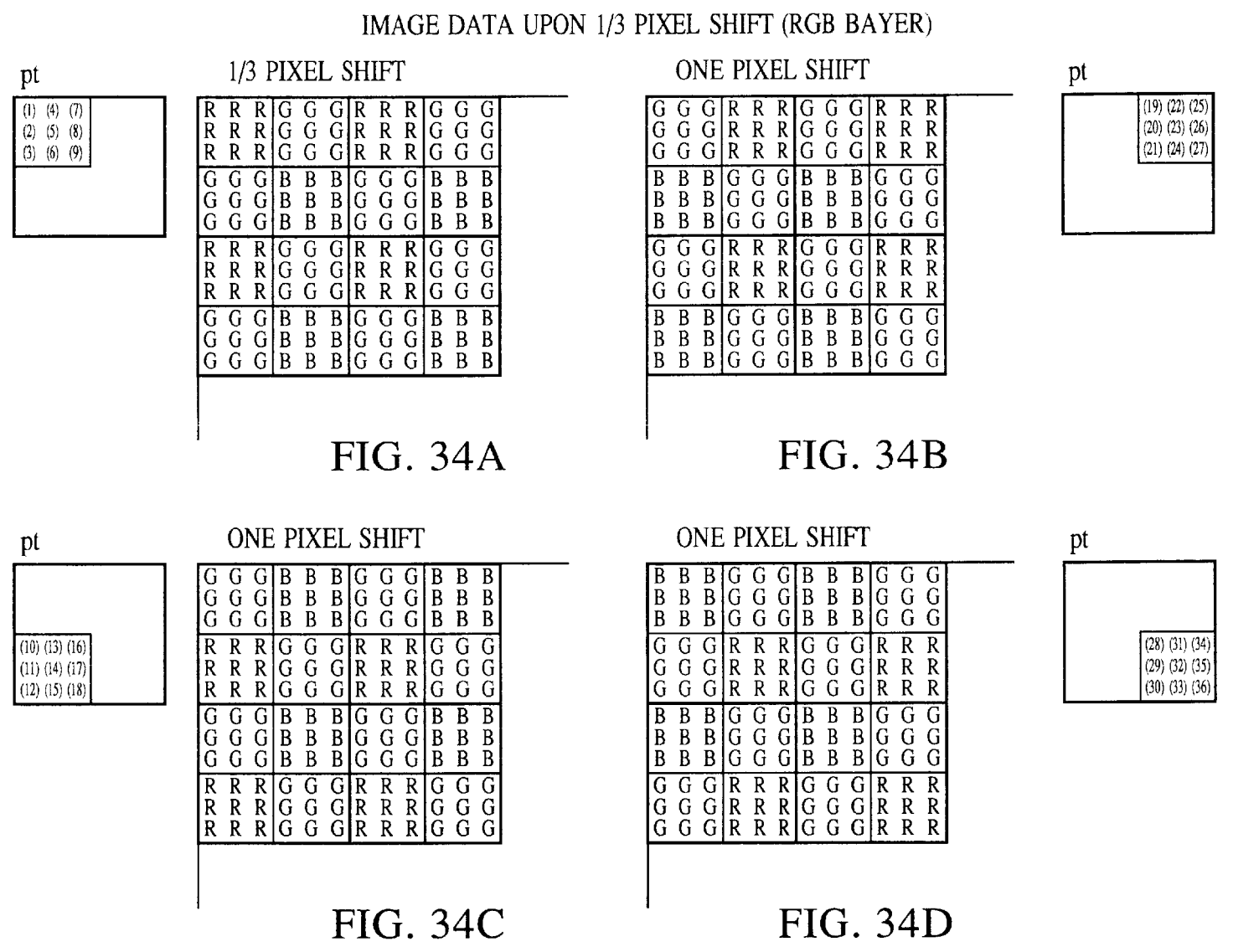

Image data acquired through this operation are shown in FIG. 34A. Since the pixel shift at the shifting pitch corresponding to ⅓ pixel pitch is performed two times in each of the X- and Y-directions, it is possible to obtain pixel data of nine pixels (3×3=9) for each of the R, G and B pixels.

Then, referring to FIG. 34C showing the left lower block, pixel shift at the shifting pitch corresponding to ⅓ pixel pitch is performed two times in each of the X- and Y-directions for each of the R, G and B pixels as indicated by (10) to (18) from a position which has been shifted one pixel in the Y-direction from the reference position (1), so that pixel data of nine pixels (3×3=9) are obtained for each of the R, G and B pixels.

Similarly, referring to FIG. 34B showing the right upper block, pixel shift at the shifting pitch corresponding to ⅓ pixel pitch is performed two times in each of the X- and Y-directions for each of the R, G and B pixels as indicated by (19) to (27) from a position which has been shifted one pixel in the X-direction from the reference position (1), so that pixel data of nine pixels (3×3=9) are obtained for each of the R, G and B pixels.

Finally, referring to FIG. 34D showing the right upper block, pixel shift at the shifting pitch corresponding to ⅓ pixel pitch is performed two times in each of the X- and Y-directions for each of the R, G and B pixels as indicated by (28) to (36) from a position which has been shifted one pixel in the X-direction and one pixel in the Y-direction from the reference position (1), so that pixel data of nine pixels (3×3=9) are obtained for each of the R, G and B pixels.

Thus, the image is picked up by shifting the block by one pixel in the Y-direction, in the X-direction and in the X- and Y-directions as in the blocks (10) to (18), (19) to (27) and (28) to (36), so that each pixel can acquire pixel data which would not be obtained by pixels of other colors if such one-pixel shifts were not performed.

Figures 35A, 35B, 35C, 35D:
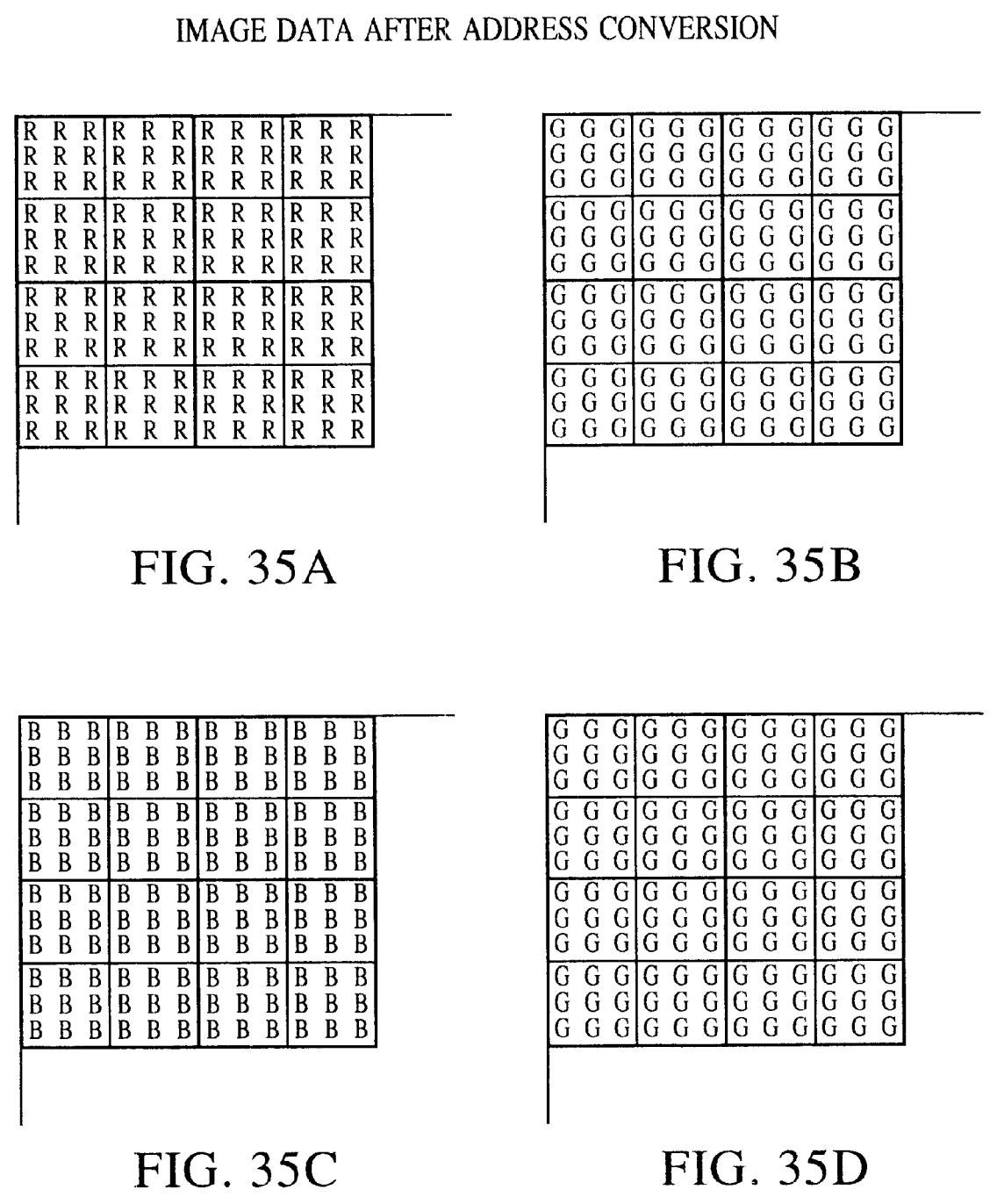

FIGS. 35A to 35 D show color signals obtained by storing in the respective color memories the color information acquired through the pixel-shifting operation, and rearranging the stored color information for each color through an address conversion on the stored color information.

As will be seen from these Figures, it is possible to obtain a resolution enhanced by a factor of three both in the X- and Y-directions for each of the pixels, and to obtain a triplicate information of each color at each pixel position. More specifically, since the ⅓ pixel-pitch shifts are performed both in the X- and Y-directions to 9 locations in total, and since four pixel color data are obtained for each color pixel, it is possible to obtain 36 pieces of color information in total as the result of the pixel-shifting operations. This means that the number of the data is 36 times as large as the number of the pixels of the imaging device, thus realizing a resolution of about 200 dpi (67×3=200).

In order to realize the pixel shifts to 36 locations, it is necessary to perform sampling at 36 positions determined by a matrix composed of 6 points spaced by ⅓ pixel pitch in the X-direction, i.e., at positions 0, ⅓, ⅔, 1, 4/3 and 5/3 in terms of the pixel pitch and 6 points spaced by ⅓ pixel pitch in the Y-direction, i.e., at positions 0, ⅓, ⅔, 1, 4/3 and 5/3 in terms of the pixel pitch, as shown in FIG. 38. FIG. 38 shows the amounts of the pixel shifts in the X- and Y-directions obtained when the above-mentioned sampling is conducted in a sequence shown in FIGS. 36A to 36D.

In this case, as in the ½ pixel-pitch shifting operation described before, the imaging device is driven in the frame all-pixel reading mode.

FIGS. 36A to 36D illustrate a similar pixel-shifting operation conducted at the ⅓ pixel pitch on a color filter having a staggered complementary-color arrangement. The pixel data picked up in the memory as a result of the pixel-shifting operations of FIGS. 36A to 36D are rearranged through an address conversion into color signal arrangements of respective colors as shown in FIGS. 37A to 37D.

The algorithm of the pixel-shifting operations is the same as that for the RGB Bayer arrangement described before, so that the algorithm is shown only through illustration and detailed description thereof is omitted.

The principle of high-quality image pickup through pixel-shifting technique has been described. With the known pixel-shifting technique described above, the resolution can be doubled at the greatest when the pitch of the pixel shift amounts to ½ pixel pitch. For instance, when this pixel-shifting operation is employed in reading full text on an A-4 paper which is laid with its longer side extending from the right to the left, the maximum resolution is 135 dpi (67×2). This level of resolution is insufficient for picking up images of 10-point fonts on a paper sheet. In addition, picking up of colored image requires an image memory having 16 frames, which raises the cost uneconomically. Furthermore, color signal processing such as white-balance processing has to be conducted on an externally connected PC. In addition, it is necessary to generate monochromatic signals to enable text data to be inputted, due to the use of primary colors regardless of whether pure colors or complementary colors, thus requiring a long processing time which is usually from 10 to 20 seconds.

The minimum required resolution level of 200 dpi is obtainable if the pitch of the pixel shift is set to be ⅓ pixel pitch. In such a case, however, an image memory having 36 frames is required, resulting in a rise of the cost as in the case of the pixel shift by ½ pixel pitch. Processing time is also prolonged in this case, due to necessity of color signal processing such as white balancing.

A description will now be given of the preferred embodiments of the present invention which are intended to improve the pixel-shifting system described hereinbefore.

More specifically, these embodiments are intended to implement the required high degree of resolution of 200 dpi or so, by effecting the pixel shift in each of the X- and Y-directions at a shifting pitch which is a ⅓ pixel pitch at the smallest.

The invention is also aimed at providing a technique which achieves a high resolution while permitting the use of an imaging device having a standard color arrangement such as staggered complementary-color arrangement, thereby preventing generation of false colors.

The invention is also intended to provide an image pickup apparatus which has an ordinary analog video output mode in addition to the high-resolution still image pickup mode, thus enabling not only pickup of still images but also pickup of moving image, while implementing a camera process which can efficiently be used in either one of these two modes.

The present invention also serves to minimize the time required for transferring high-resolution still image data to PCs, by selectively sending only the desired portion of the image data.

Embodiments of the image pickup apparatus of the present invention will now be described.

First Embodiment

FIG. 1 is a block diagram of a visualizer as an embodiment of the image pickup apparatus of the present invention. The visualizer has a pixel-shifting mechanism 2 disposed behind an image pickup lens 1. The pixel-shifting mechanism employs, for example, a plane-parallel plate disposed in the optical path of the image pickup lens system. The arrangement is such that the angle of the plane-parallel plate with respect to the optical axis is varied so as to shift the position on the imaging surface upon which the incident light beams impinges. With this arrangement, it is possible to pickup optical information which otherwise would uselessly impinge upon the regions between adjacent pixels, thus contributing to the enhancement of the resolution.

The image pickup apparatus further has an imaging device 3 such as a CCD, provided with an on-chip filter which may have an RGB primary-color Bayer arrangement or a later-mentioned staggered arrangement of complementary color cells. The image pickup apparatus also has a correlated double sampling circuit (CDS) and an automatic gain control circuit (AGC) which will be collectively referred to as "CDS/AGC circuit" and denoted by 4. Numeral 5 denotes an imaging device driving circuit (V drive) for driving the imaging device, while 6 denotes a timing generator (TG) which generates various timing signals necessary for driving the imaging device 3.

A microcomputer 7 performs an overall control of the whole image pickup system and controls also an electric circuit 8 for driving the pixel-shifting mechanism 2. A camera head 9 constitutes an image pickup section 9 of the image pickup apparatus.

The image pickup section 9 is connected through a cable 10 to a later-mentioned image processing section. Provided also are an A/D converter for converting the image signals derived from the imaging device 3 into digital signals, an image memory 12 for storing the high-resolution still image, a memory controller 13 for controlling the addresses of the data written in and read from the image memory, and an adder circuit 14 for adding data read from two adjacent pixel lines, referred to as upper and lower lines, stored in the image memory 12. The image pickup apparatus further has a camera process circuit 15 for generating luminance signal (Y) and chromatic signals (R-Y, B-Y) from color signals corresponding to staggered complementary-color pixel pattern of the color filter, a horizontal scaler for normalizing the aspect ratio of the area of the imaging device into a square pixel pattern of 1:1 aspect ratio, a buffer used in transferring the image data to a PC, and an RGB matrix circuit 18 for generating RGB signals from the luminance signal and color signals.

Numeral 19 designates an interface controller for controlling an interface (I/F) which undertakes transfer of data between the image pickup apparatus and a PC. An USB or an IEEE 1394 or the like, capable of performing a high rate transfer, is used as the interface. The interface controller 19 constitutes transferring means in the invention, by itself or in combination with the buffer memory 17.

Numeral 20 designates a microcomputer (system computer) which performs an overall control of the whole system including the image pickup section 9 and the image processing section which was mentioned before and which is denoted by 22. A change-over switch 21 performs switching between two modes of output, i.e., between a luminance signal plus chromatic signals and RGB signals. The memory controller 13 and the system controller 20 in combination or independently form controlling means. A series of processings including pixel-shifting processing, image pickup processing, reading of the pixel data from the imaging device and storage of the read data in the image memory, address conversion and data transfer, each of which will be described below, are executed by a program stored in a recording medium such as a ROM in a system controller 20 or a program stored in a recording medium on an externally connected PC.

Major components of the image pickup apparatus embodying the present invention have been described. The operation of the apparatus will now be described.

An optical image of a subject (not shown) coming into the image pickup apparatus through the image pickup lens 1 is received by the pixel-shifting mechanism 2 which is interposed between the image pickup lens 1 and the imaging device 3. Therefore, even if the zooming ratio of a zoom lens used as the image pickup lens 1 is changed, the mechanical operation to be performed by the pixel-shifting mechanism purely depends on the pixel pitch of the imaging device 3 alone, without being affected by the state of the image pickup lens 1.

Assuming here that a ⅓-inch CCD sensor having 410,000 pixels in total is used as the imaging device 3, the pixel pitch of the CCD is 6.35 μm in horizontal (line) direction and 7.4 μm in vertical (column) direction. Thus, a pixel shift at a shifting pitch amounting to ⅔ pixel pitch is performed by shifting the optical path by 4.23 μm and 4.93 μm, respectively, in the horizontal and vertical directions.

Figure 2:
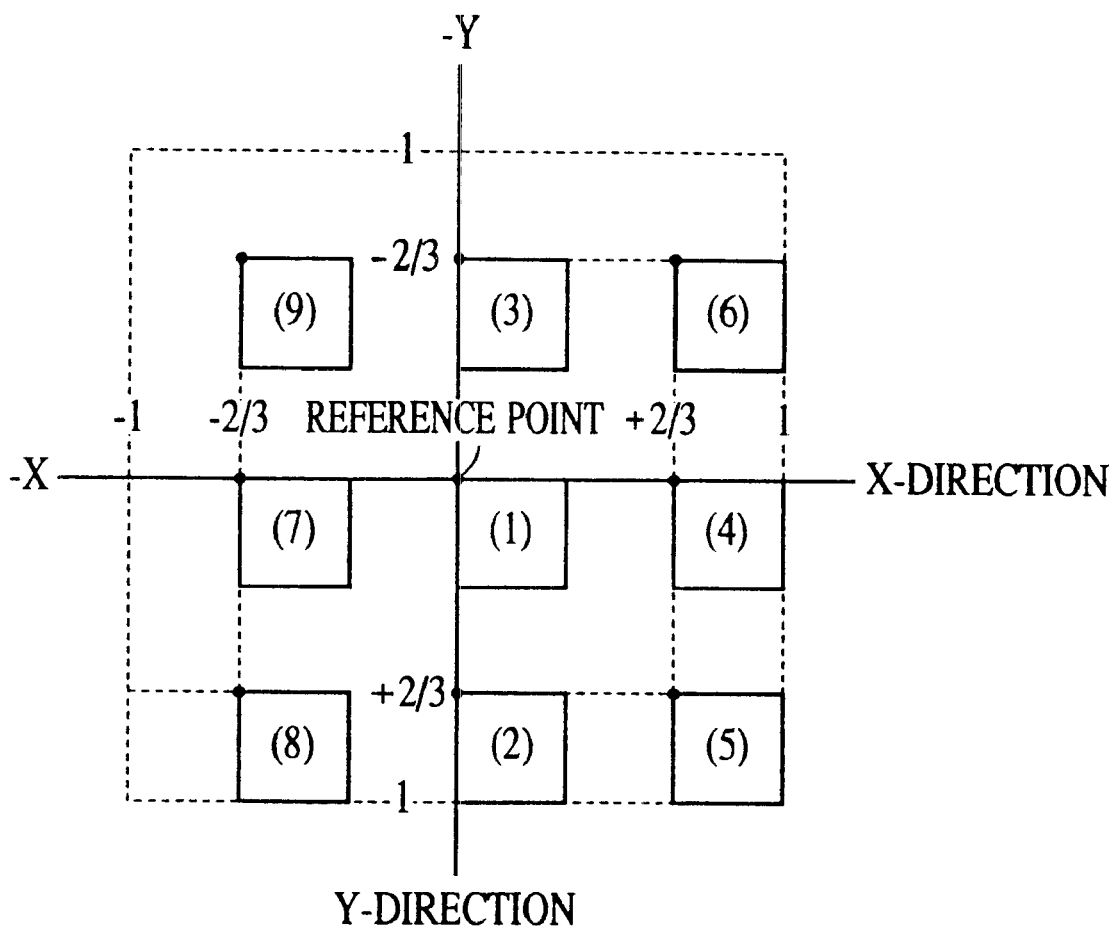
FIG. 2 is an illustration of an algorithm of a pixel shift by ⅔ pixel pitch.

The shift of the optical path, i.e., the pixel shift, is performed in plus and minus directions along the horizontal axis (line direction) at a pitch amounting to ⅔ of the horizontal pixel shift. Similarly, the shift of the optical path, i.e., the pixel shift, is performed in plus and minus directions along the vertical axis (column direction) at a pitch amounting to ⅔ of the vertical pixel shift. These pixel shift operations in the horizontal and vertical directions are performed independently of each other by the pixel-shifting mechanism. FIG. 2 shows the relative positions between the light beam and the imaging device in the course of the pixel-shifting operations.

Referring to FIG. 2, numeral (1) indicates a reference position, (2) indicates a position reached as a result of ⅔ pixel-pitch shift in the Y-direction, i.e., in the vertical direction, (3) indicates the position reached as a result of -⅔ pixel shift in the Y-direction, (4) indicates a position reached as a result of ⅔ pixel-pitch shift in the X-direction, i.e., in the horizontal direction, and (7) indicates the position reached as a result of -⅔ pixel shift in the X-direction.

Numerals (5), (6), (8) and (9) respectively indicate the relative positions attained as results of pixel-shifting operations performed at ±⅔ pixel pitches in the X- and Y-directions.

In FIG. 2, the reference point (indicated by a dot mark "·") for each pixel is always shown at the left upper corner.

Thus, FIG. 2 shows a pixel-shifting operation (shifting of the optical path) to nine relative positions. FIGS. 4A to 4C show image signals obtained as a results of this pixel-shifting operation performed on a staggered complementary-color filter of FIG. 3A having cyan (C), yellow (Y), green (G) and magenta (M) color pixels.

This operation will be described in more detail.

Figures 3A, 3B, 3C:
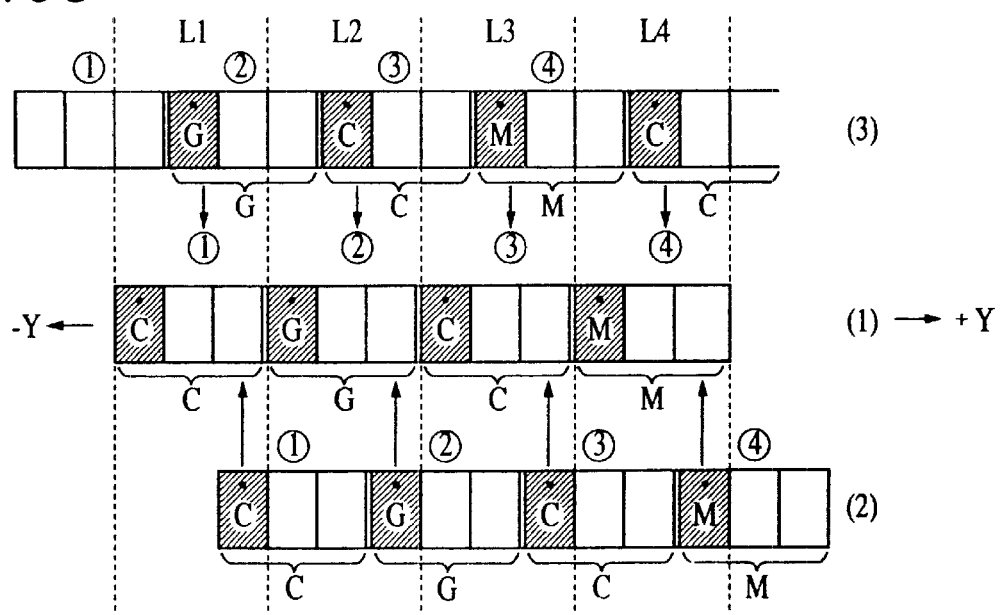
FIGS. 3A to 3C are illustrations of a staggered complementary-color filter arrangement, pixel arrangement of higher density realized by a pixel shift operation, i.e., the pixel arrangement after address conversion, and the manner in which the pixel-shifting operation is performed.

FIGS. 4A to 4C illustrate the concepts of the sampling data obtained when pixel-shifting operations are performed in upward, downward, leftward and rightward at the shifting pitches amounting to ⅔ of the vertical and horizontal pixel pitches, for the 4×4=16 pixels presented by the staggered complementary-color filter of FIG. 3A.

When the staggered complementary-color filter of FIG. 3A is used, inherent data of the C pixel is obtained by the C pixel which is at the left upper corner of FIG. 3A, when the shifting has not been performed, i.e., at the reference position (1).

FIG. 3C shows the pixel arrangements of the C,G,C,M pixels as obtained in the Y-direction at the reference position (1). Respective pixels are shown by squares □-□. Each pixel is divided at a ⅓ pitch. The reference point shown in FIG. 2 is indicated by a dot mark "·" in each pixel of FIG. 3C. It is also assumed that, at the reference position (1), the pixels □-□ receive light beams L1 to L4, respectively.

When a ⅔ pixel-pitch shifting is performed on the pixels □-□ in the Y-direction as indicated by (2) of FIG. 3C with respect to the reference position shown by (1) of FIG. 3C, the reference points of the respective pixels □-□ receive light beams L1, L2, L3 and L4. This state is the same as that obtained at the reference position (1).

Conversely, if a ⅔ pixel-pitch shifting is performed in the -Y direction as indicated by (3) of FIG. 3C, from the reference position shown by (1), the reference points "·" of the pixels □-□ which starts from the pixel G following the pixel C receive the light beams L1 to L4, whereby the light beams impinge upon the pixels G, C, M and C which are of different colors of the pixels that receive these light beams when the pixels are at the reference position (1).

Consequently, sampling is performed three times on the C, G, C and M pixels □-□ as a result of the pixel-shifting operations conducted two times at the ⅔ pixel pitch as shown in FIG. 3C. Thus, samples are obtained in color arrangements CGC, GCG, CMC and MCM for the C, G, C and M pixels indicated by □-□, whereby the pixel number in effect is triplicated.

FIGS. 4A to 4C show the manner in which the above-described pixel-shifting operation is performed on the pixel arrangement shown in FIG. 3A. In FIG. 4A, numeral (1) indicates the above-mentioned reference position, (2) indicates the position after the ⅔ pixel-pitch shift in the Y-direction and (3) indicates the position after the ⅔ pixel-pitch shift in the −Y direction.

In this Figure, the pixel data obtained at the reference position (1) are shown by squares hatched with oblique lines which ascend in the rightward direction. The pixel data obtained at the reference position (2) are shown by squares hatched with oblique lines which descend in the rightward direction, while the pixel data obtained at the reference position (3) are shown by squares hatched with horizontal lines.

The pixel data arrangement as shown in FIG. 4A is obtained for the reasons stated above. Thus, a block composed of 9 pixels (3×3=9) shown in FIG. 4A corresponds to one pixel in FIG. 3A.

Similarly, FIG. 4B shows the arrangement of data as obtained as the results of the ±⅔ pixel-pitch shift to the positions (4), (5) and (6) shown in FIG. 2. More specifically, in this Figure, the pixel data obtained at the shifted position (4) are shown by squares hatched with oblique lines which ascend in the rightward direction. The pixel data obtained at the shifted position (5) are shown by squares hatched with oblique lines which descend in the rightward direction, while the pixel data obtained at the shifted position (6) are shown by squares hatched with horizontal lines.

Figure 5:
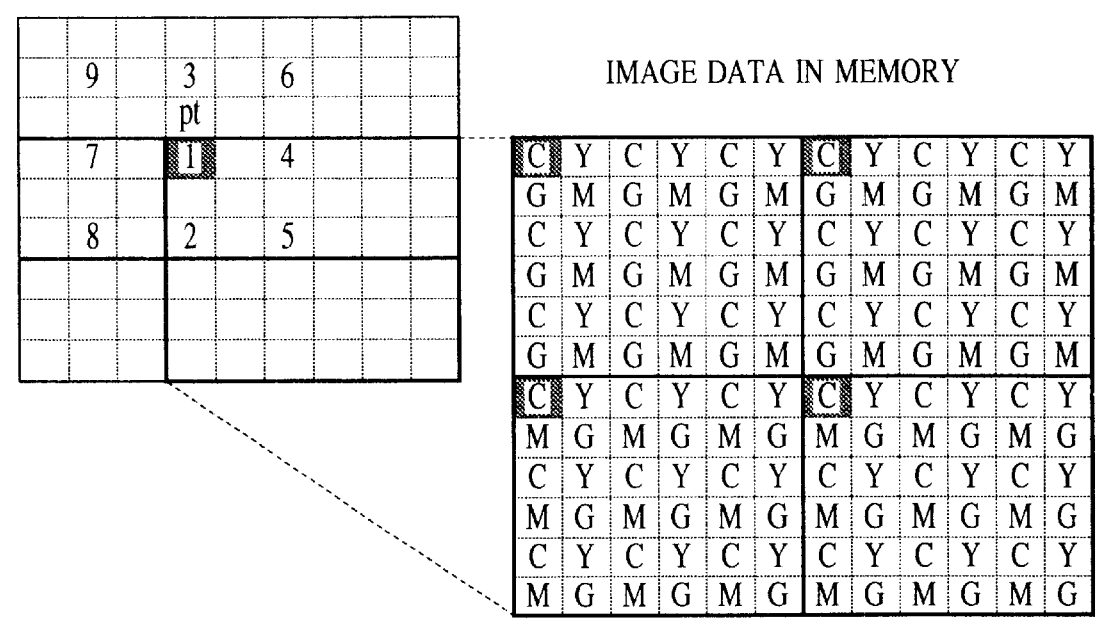

Image data formed by spatial arrangement of pixel data as shown in FIG. 5 is obtained as a result of the above-described pixel-shifting operations to the nine relative positions.

FIG. 3B shows the pixel data arrangement of FIG. 5, transformed to facilitate a comparison with the color pixel arrangement of the staggered complementary-color filter shown in FIG. 3A.

From a comparison between the arrangement shown in FIG. 3A and that of FIG. 3B, it will be seen that the data of triplet density in terms of the pixel number are obtained as a result of the ±⅔ pixel shift, although there is discordance in regard to arrangement of the green (G) data and discordance in regard to magenta (M) data.

FIG. 6A illustrates a driving method implemented by the pixel-shifting mechanism in X- and Y-directions for the purpose of implementing the shifting to nine relative positions shown in FIG. 2.

Pixel-shifting operations by 0, +⅔ and −⅔ in terms of the pixel pitch are performed in each of the X- and Y-directions. Thus, the pixel-shifting operation is repeated nine times per frame, whereby image data of nine frames are obtained.

The pixel-shifting is to cause a relative movement between the light beams and the pixels. Therefore, pixel-shifting operations by 0, ⅔ and ⅓ pixel pitch in each of the X- and Y-directions as shown in FIG. 6B produce the same effect as that obtained through the operation explained in connection with FIG. 6A.

It is to be noted here that, as will be clearly understood from a comparison between FIG. 3A and FIG. 3B, the discordance between the arrangement shown in FIG. 3A and that shown in FIG. 3B in regard to green (G) and magenta (M) can be canceled if a suitable operation is performed to replace pixel data on the memory. Thus, the pixel arrangement shown in FIG. 3B can be corrected into the same arrangement as that of the ordinary staggered complementary-color filter of FIG. 3A by such replacement of pixel data. The pixel data after this correction can advantageously be processed by an ordinary camera process circuit.

This means that an identical circuitry of the system can be used both in a mode for picking up moving image and in a mode for picking high-resolution still images, and contributes to a great reduction of the additional signal processing to be performed by an externally connected PC, thus offering remarkable advantages such as higher processing speed, higher efficiency of use of memory and simplification of circuitry.

Elimination of discordance in regard to green (G) and magenta (M) is thus implemented by the replacement of the pertinent pixel data on the memory. This, however, is not exclusive. It is possible to obtain a spatial arrangement of the pixel data identical to the pixel arrangement by a method other than the replacement of pixel data on the memory, e.g., by a suitable change of the pixel-shifting algorithm so that pixel data spatial arrangement which is the same as that of an ordinary staggered complementary-color filter can be obtained immediately as the result of the pixel-shifting operations. This alternative method will be described below in more detail.

A description will now be given of a case where the described pixel-shifting operations to implement the shifting to the nine relative positions is applied to an imaging device having a color filter of a color pixel arrangement other than the staggered complementary-color arrangement, e.g., to an imaging device having an RGB Bayer color filter. The algorithm of the pixel-shifting operation is the same as that described before in connection with the staggered complementary-color filter. Therefore, only the results of the pixel-shifting operations are illustrated, with the detailed description of the algorithm being omitted.

Figure 9:
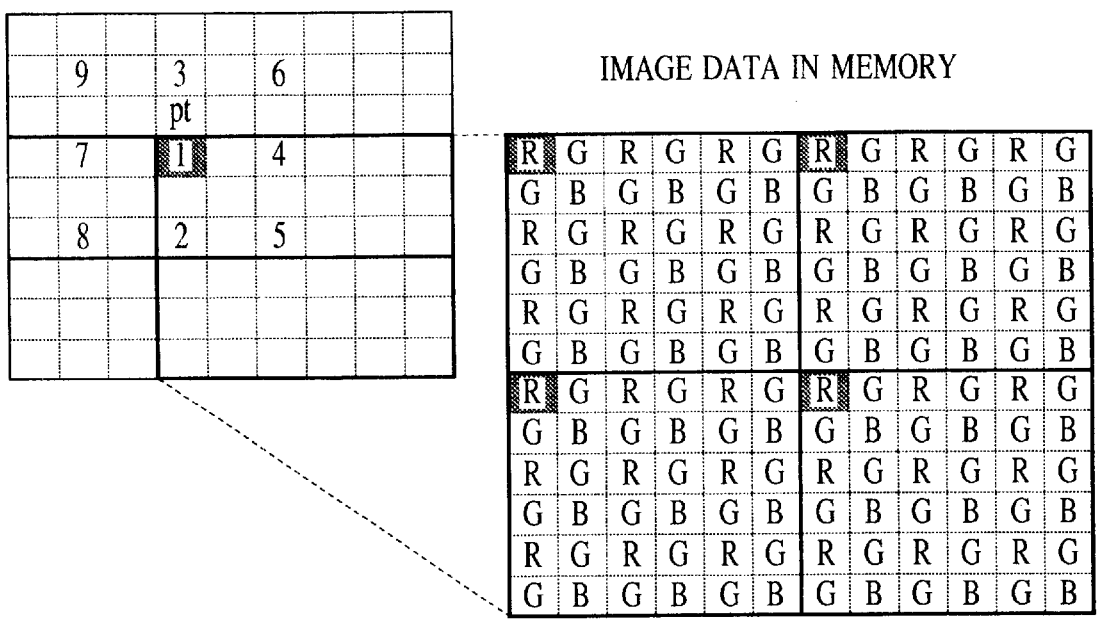
FIG. 9 is an illustration of pixel data stored in an image memory through the ⅔ pixel-pitch shifting operation.

FIG. 7A shows a primary-color RGB Bayer arrangement. FIGS. 8A, 8B and 8C show pixel data arrangements at the respective relative positions similar to those for the staggered complementary-color arrangement described before with reference to FIGS. 4A to 4C. FIG. 9 shows the spatial arrangement of the pixel data as obtained after the completion of the pixel-shifting operations to all the nine relative positions.

FIG. 7B shows a pixel arrangement transformed from the spatial arrangement of FIG. 9 in accordance with the filter arrangement of FIG. 7A. From a comparison between FIG. 7A and FIG. 7B, it will be seen that the pixel data arrangement of FIG. 7B is exactly the RGB Bayer arrangement having a pixel density which is a triplicate of that of the ordinary staggered complementary-color filter shown in FIG. 7A.

This means that, when the color filter used on the imaging device has an RGB Bayer arrangement, the high-resolution still image of the triplicated density, obtained through the ⅔ pixel shifts in the X- and Y-directions, can be subjected to the same image processing as that for moving images which does not employ any pixel-shifting technique. In this case, therefore, an identical camera process circuit can be used both for the high-resolution still-imaged and moving images.

In other words, the high-resolution still images can be processed by an ordinary television signal processing circuits such as NTSC which is used for the processing of moving images.

A description will now be given of a technique which, when used on an imaging device having a staggered complementary-color filter, eliminates the aforementioned discordance in regard to green (G) and magenta (M) by addition of a predetermined movement of relative positions in the course of the pixel-shifting operations. This technique therefore provides, upon completion of the pickup of pixel information through the pixel-shifting operations, a pixel arrangement which is the same as that of ordinary staggered complementary-color filter.

Figure 10A:
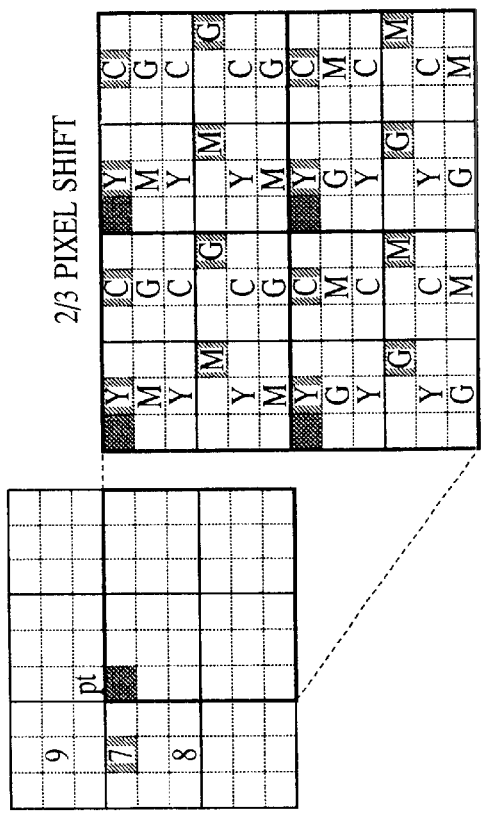
FIGS. 10A to 10C are illustrations of operation performed by a correcting means which corrects pixel arrangement after the pixel-shifting operation.
Figure 10B:
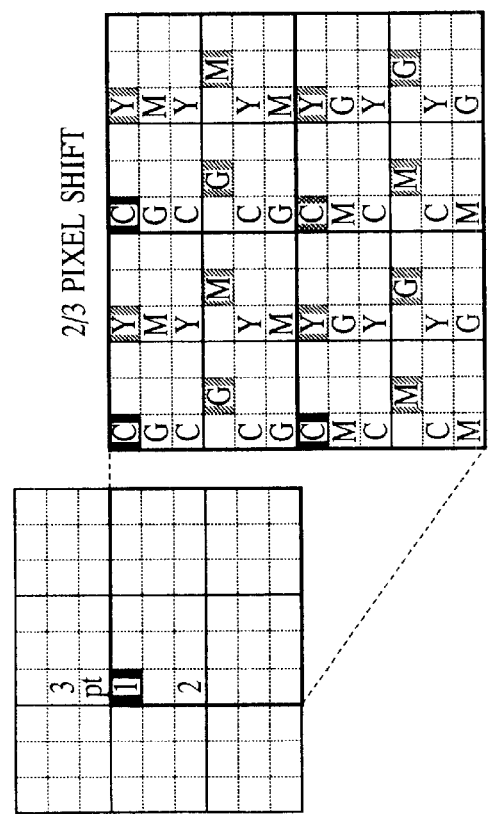
Figure 10C:
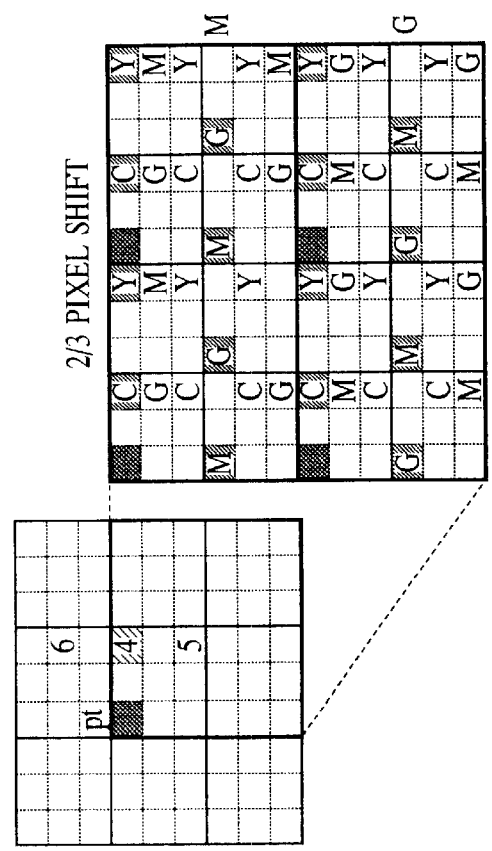

This technique is illustrated in FIGS. 10A to 10C.

Referring to these Figures, a horizontal (X-direction, i.e., line direction) pixel shift by ⅓ pixel pitch is additionally performed only on the lines of green (G) and magenta (M), with respect to the pixels hatched with rightwardly ascending hatching lines, i.e., with respect to the relative positions (1), (4) and (7), thereby effecting correction of green and magenta arrangements. This additional shift may be made either in the plus (+) or minus (−) direction, although in FIGS. 10A to 10C the additional ⅓ pixel-pitch shift is performed in the plus direction.

A correction equivalent to that described above can be performed by effecting an additional one-pixel-pitch shift in the line or horizontal direction (X-direction) for the lines of green (G) and magenta (M), with respect to the pixels hatched with rightwardly ascending hatching lines, i.e., with respect to the relative positions (1), (4) and (7), as shown in FIGS. 11A to 11C. This additional shift by one pixel pitch may be made either in the plus (+) or minus (−) direction, although in FIGS. 11A to 11C the additional one-pixel-pitch shift is performed in the plus direction. Final image data as shown in FIG. 12 is obtained as a result of the described additional horizontal shifts of the green (G) and magenta (M) lines at a pitch of ⅓ pixel pitch or one pixel pitch.

Figure 12:
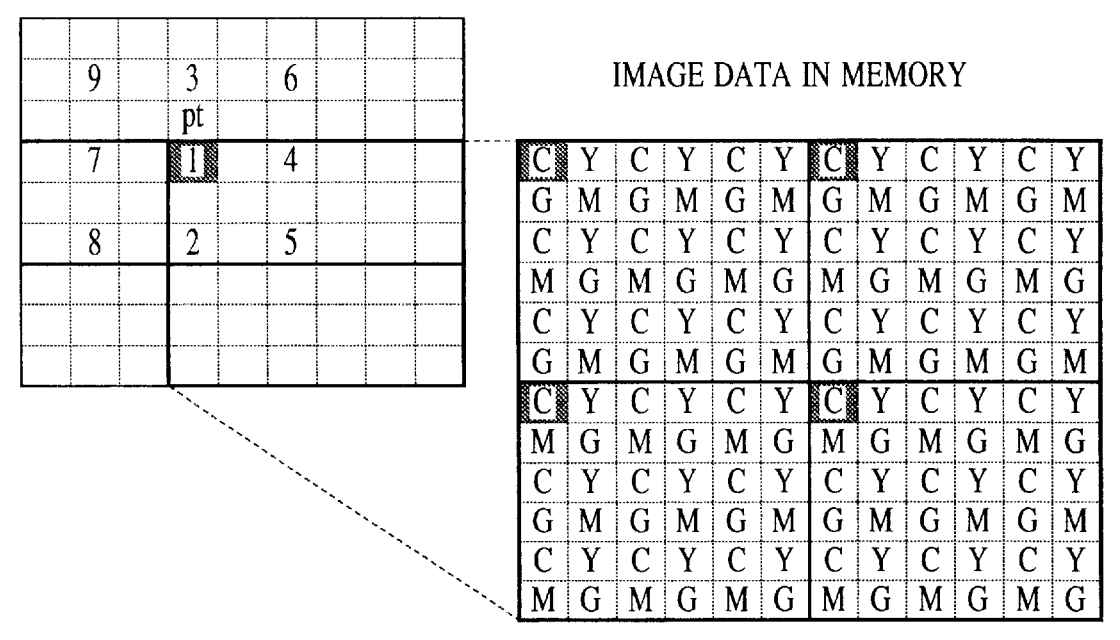

The final data arrangement shown in FIG. 12 can be transformed into an arrangement shown in FIG. 13. From a comparison between FIG. 3A and FIG. 13, it will be seen that the final data arrangement as shown in FIG. 12 is a staggered complementary-color arrangement having a pixel density three times as high as the pixel arrangement of the filter shown in FIG. 3A.

It is possible to process, with the same camera signal process as that ordinarily used for moving images, high-resolution still images having triplicated pixel density, even when a staggered complementary-color filter is used on the imaging device, provided that the correction is performed by the additional horizontal shift at ⅓ pixel pitch or one pixel pitch.

This means that an ordinary camera signal processing circuit designed for complementary-color filter can be used both for the moving images and high-resolution still images. Consequently, an image pickup apparatus is implemented which can pickup both high-resolution still images and ordinary moving images.

FIG. 14 illustrate the manner of driving of the pixel-shifting mechanism when the correction for green (G) and magenta (M) is effected by the horizontal ⅓ pixel-pitch shift, while FIG. 15 illustrate the manner of driving of the pixel-shifting mechanism when the correction for green (G) and magenta (M) is effected by the horizontal one-pixel-pitch shift. In both cases, the additional horizontal shift for correction is performed only at the relative position (1), (4) or (7) and only for the fields which read G or M line.

No specific restriction is posed on the construction of the pixel-shifting mechanism. Any appropriate mechanism can be used provided that it can perform the aforesaid ±⅔ pixel-shifting operations both in the X- and Y-directions.

An additional set of X-direction pixel-shifting mechanism may be employed for the purpose of implementing the above-described additional horizontal shifts for correction in regard to G and M colors.

The operation of the pixel-shifting mechanism as described can be implemented by the pixel-shift driving circuit 8 which operates under the control of the microcomputer 7 in accordance with the instructions given by the system control circuit 20.

Thus, an optical image of the subject is focused on the imaging device 3, through the pixel-shifting operations performed by the pixel-shifting mechanism which operates based on the described principle.

More specifically, the imaging device 3 is driven in a frame all-pixel reading mode by the driving circuit 5 in accordance with the timing given by the TG 6. When a staggered complementary-color filter is used on the imaging device 3, only signals corresponding to cyan (C) and yellow (Y) colors are read from a first field, whereas, from a second field, only the signals corresponding to green (G) and magenta (M) colors are read.

The output signals from the imaging device 3 are supplied to the CDS/AGC circuit 4, so that the signals are subjected to correlated double sampling processing and then amplified to a predetermined level. The output from the CDS/AGC circuit 4 is supplied through the cable 10 to the A/D converter 11 so as to be converted into digital color signals.

The digital color signals are formed in the spatial arrangement shown in FIG. 12 as a result of the pixel-shifting operations, and are stored in the image memory 12 in the form of the spatial arrangement of FIG. 12.

This writing operation is performed under the control of the memory controller 13 which in turn is controlled by the system controller 20.

Figure 16:
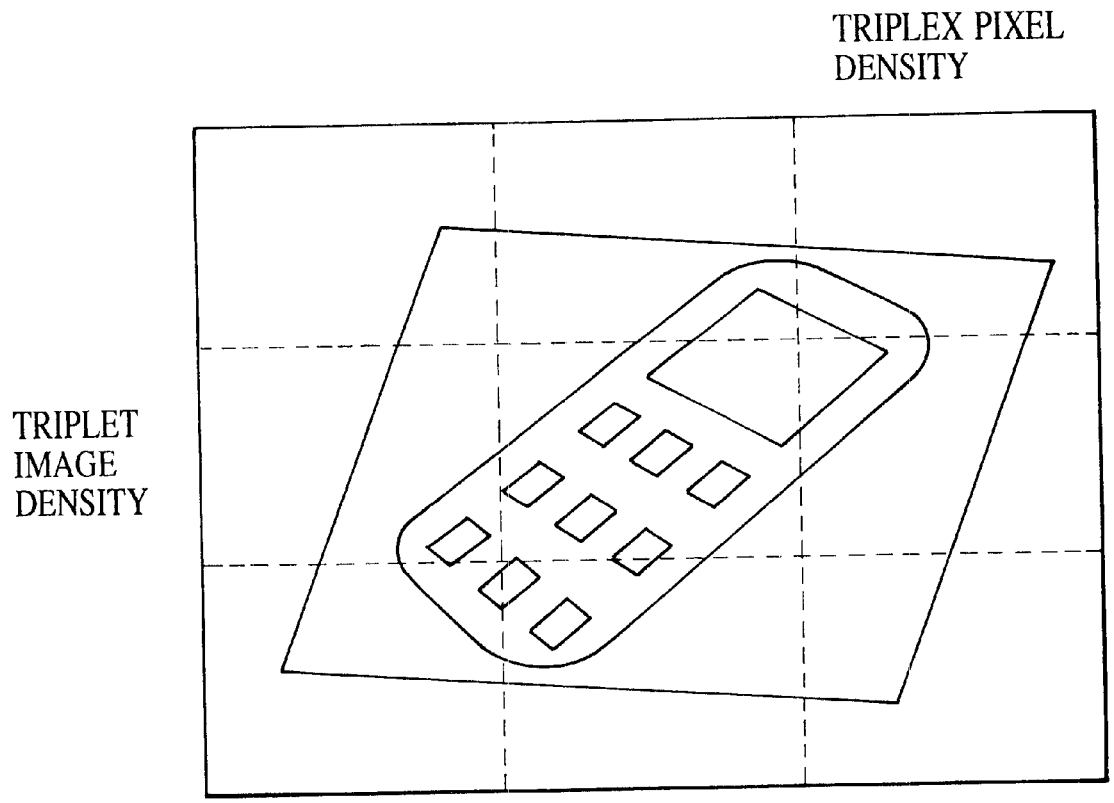
FIG. 16 is an illustration of an image corresponding to image information stored in the image memory.
Figure 17:
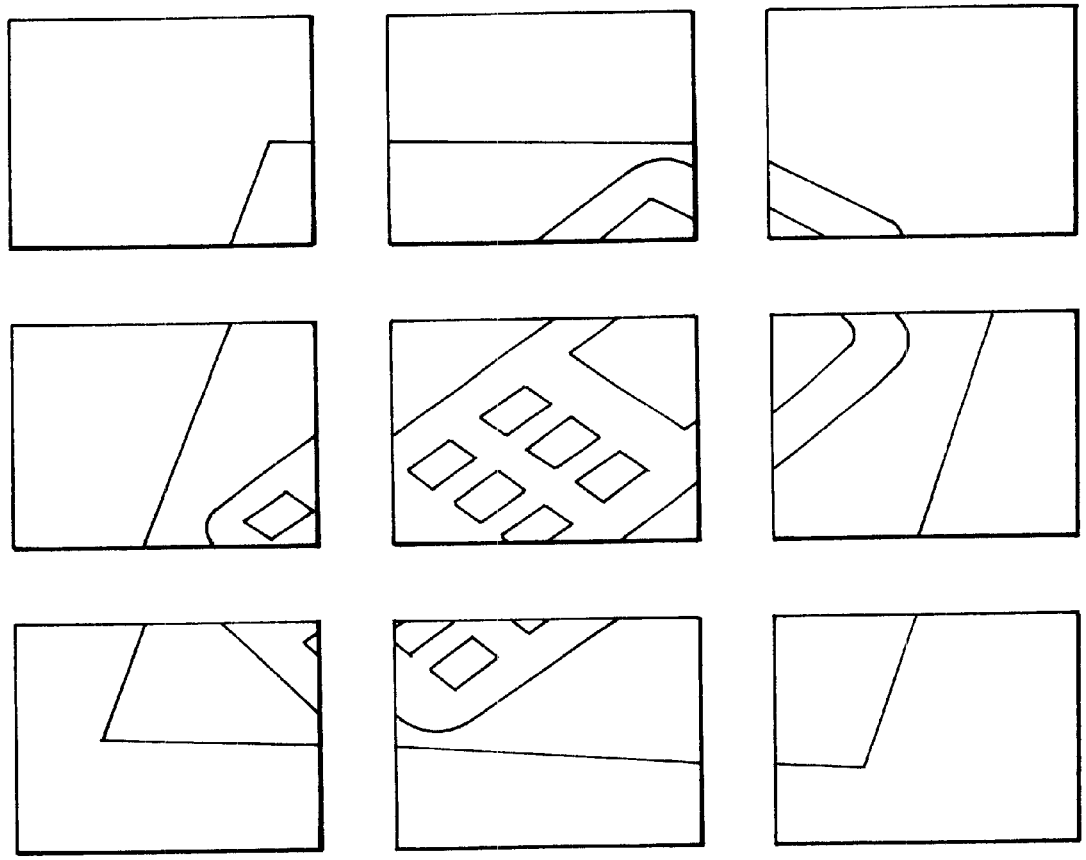
FIG. 17 is an illustration of the manner in which image is transferred from an image memory.

The image data written in the image memory 12 has triplicated pixel density both in the line (X) and column (Y) directions. Schematically, the image data thus written has the triplicated pixel density, with the same framing, i.e., the same pixel arrangement, as that of ordinary image data which has not undergone the pixel-shifting operation, as will be seen from FIG. 16.

After completion of the writing operation, the image data in the image memory 12 is read in accordance with the operation of the memory controller 13 such that the stored data is formed into nine frames and read on a frame basis, i.e., one frame is read at a time.

Simultaneously with the reading of the stored data on a frame basis, data of a couple of lines, i.e., upper and lower lines, are simultaneously read and are added together by the operation of the adder circuit 14, so as to be transformed into field image data.

The field image data outputted from the adder circuit 14 is supplied to the camera process circuit 15 which is designed to conduct ordinary digital camera signal processing for generating luminance signal and chromatic signals from field signals read through ordinary staggered complementary-color filter, whereby a luminance signal and chromatic signals are obtained from the field image data outputted by the adder circuit 14.

The digital signals thus outputted from the camera process circuit 15 are supplied to the horizontal scaler 16 which transforms the aspect ratio of the pixel into square form having 1:1 aspect ratio. This conversion of aspect ratio is necessary for the purpose of displaying the image formed by the pixel data on a PC display.

Obviously, the scaler 16 can be dispensed with if the imaging device has the pixels having the aspect ratio of 1:1.

The image data after the scaling is supplied to the transferring buffer memory 17 in which pixel data corresponding to one frame are accumulated.

The interface controller 19 performs such a control that a predetermined quantity of data corresponding to a predetermined transfer rate is read from the transferring buffer memory 17. The data thus read from the buffer memory 17 is supplied to the interface controller 19 as it is or after a conversion into RGB signals through the RGB matrix circuit 18 if necessary.

The interface controller 19 communicates with the PC in accordance with an ordinary transfer method, thereby transferring the image data. No specific restriction is posed on the interface, although a high-rate transfer interface such as IEEE 1394 is employed in the described embodiment. Thus, the interface may be selected depending on factors such as matching with the PC.

Upon completion of transfer of one frame of image data, the buffer memory 17 now empty receives image data for the second frame from the image memory 12. The read image data undergoes the same processing as that described before and are accumulated in the buffer memory 17 so as to be transferred to the PC through the operation of the interface controller 19.

The described processing and transfer of image data is conducted for each of the nine frames, whereby a single high-resolution still image becomes available on the PC.

The system controller 20 controls the respective components in accordance with a predetermined sequence, thereby implementing the operations described hereinbefore.

It is to be noted that, in the first embodiment of the invention, a further improvement of the quality of the high-resolution still image can be achieved through reduction of false signals, by using an optical low-pass filter interposed between the image pickup lens 1 and the imaging device 3.

FIG. 18 illustrates characteristics of such an optical low-pass filter. A section (a) of this Figure shows an optical low-pass filter implemented by a quartz birefringence plate having birefringence amounting to ⅓ pixel pitch in the horizontal (X) direction. This low-pass filter therefore exhibits optical low-pass function performed in the horizontal direction.

A section (b) of this Figure shows a similar optical low-pass filter which produces a low-pass filtering effect in the vertical (Y) direction.

A section (c) of this Figure shows a similar optical low-pass filter which produces a low-pass filtering effect both in the horizontal (X) and vertical (Y) directions.

Section (d) of this Figure shows an arrangement in which a pair of quartz birefringence plates are disposed, one having birefringence of ⅓ pixel pitch in the X-direction and one having birefringence of ⅔ pixel pitch in oblique (45°) direction. Thus, the arrangements shown in sections (a), (b), (c) and (d) respectively produce effect to reduce false colors in the X-direction, in the Y-direction, in the X- and Y-direction and in the X-direction plus 45° oblique direction.

According to the above-described pixel-shifting system employed in the present invention, it is possible to read all the pixel data from the imaging device and to store the read pixel data in a memory in the same spatial pixel arrangement as that obtained by an imaginary imaging device having the same pixel arrangement as the actually-used imaging device but with greater number of pixels. In addition, when the stored data are read from the memory and delivered to the camera process circuit, pixel data of two adjacent lines, i.e., upper and lower lines, are added together by the adder circuit. Therefore, there is no reduction in the resolution of the image prior to the storage in the memory.

In a known method of reading field image from an imaging device, data from two odd-number lines are simultaneously read in an adding manner in a first field, whereas, in a second field, data are read in an adding manner from two even-number lines. In this known field reading operation, mutually overlapping two lines are alternately read, so that the size of the imaginary pixels is increased to that of three pixels, so that no appreciable improvement in resolution is achieved even if the pixel-shifting technique is applied. This is because the pixel-shifting operation used in such a conventional field reading operation serves to shift the pixel positions while the pixel data are being read in adding manner from every two lines of pixels.

In contrast, according to the present invention, data are read from all the pixels of the imaging device and stored in the memory. High image quality due to the pixel-shifting operation was acquired when the data are stored in the memory. The reading of pixel data is then performed from two adjacent lines, not from every two lines, of the pixel data in the memory in which the data have been stored in a spatial arrangement which provides high image quality. In accordance with the invention, therefore, it is possible to reduce the degradation of the imaginary pixel as compared with the case of the conventional field reading technique.

Second Embodiment

Figure 19:
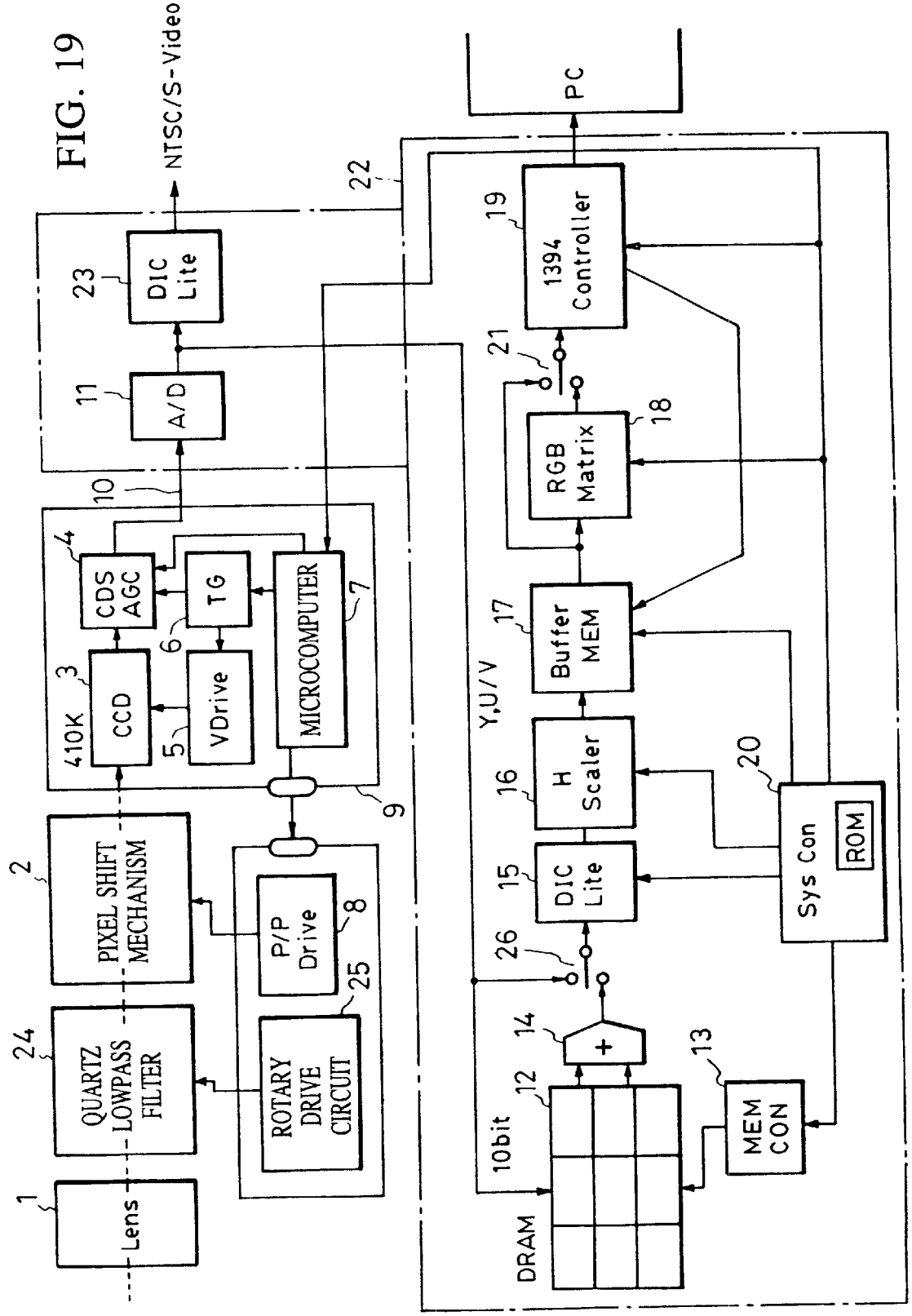
FIG. 19 is a block diagram of a second embodiment of the image pickup apparatus in accordance with the present invention.
Figure 20:
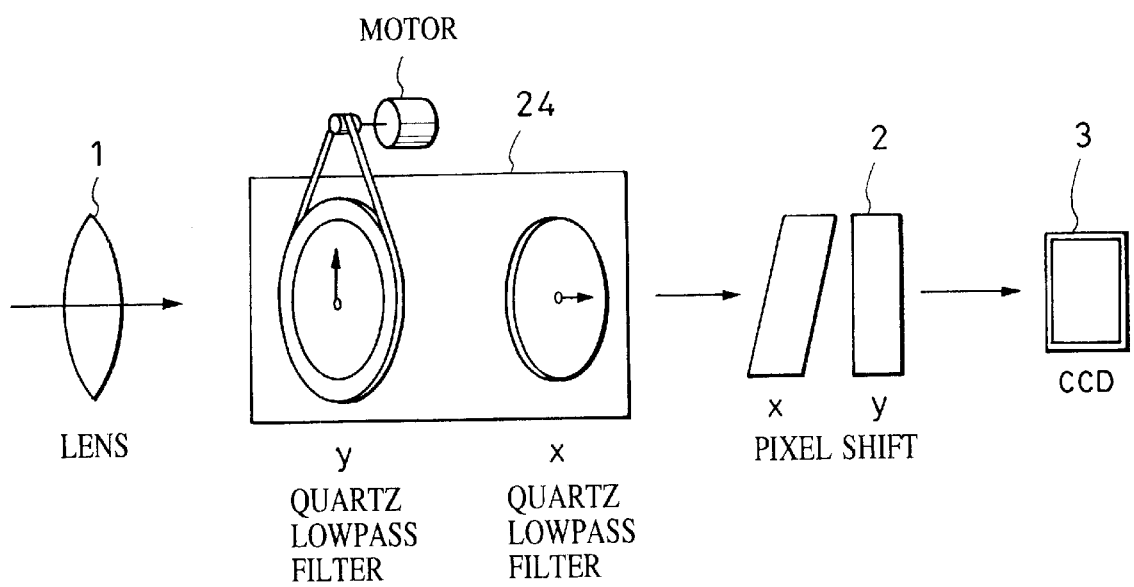
FIG. 20 is an illustration of a driving system for driving the optical low-pass filter.

FIG. 19 is a block diagram showing the construction of an image pickup apparatus as a second embodiment of the present invention. This image pickup apparatus is distinguished from that of the first embodiment by the provision of a moving image outputting function. Thus, the image pickup apparatus of the second embodiment is adapted both for moving images and high-resolution still images.

The following description of the second embodiment is therefore focused mainly on these features which are not implemented in the first embodiment shown in FIG. 1.

Referring to FIG. 19, numeral 23 designates a camera process circuit having the same function as that of the camera process circuit shown in FIG. 1. Numeral 24 designates an optical low-pass filter having a rotary mechanism and capable of validating and canceling the filtering function according to its rotational position. Numeral 25 designates a rotary drive circuit which drives the rotary mechanism of the optical low-pass filter 24. Numeral 26 denotes a change-over switch.

The operation of the second embodiment is as follows. The system controller 20 supplies a control signal to the microcomputer 7, such as to cause the apparatus to operate in the moving image pickup mode in the initial state of operation.

The microcomputer 7 controls the rotary drive circuit 25 based on the above-mentioned control signal. The rotary drive circuit 25 has a motor which rotates a Y-direction quartz low-pass filter for example, so that birefringence takes place in the vertical (Y) direction as shown in FIG. 21B.

In the meantime, the X-direction quartz low-pass filter is fixed such that birefringence takes place in the horizontal (X) direction as shown in FIG. 21A. These optical low-pass filters in cooperation provide an optical low-pass filter which produce birefringence at one pixel pitch in each of the X- and Y-directions. It is thus possible to avoid generation of false colors during the operation in the moving image mode.

The microcomputer 7 also controls the TG (timing generator) 6 so as to set the imaging device to the field reading mode in which pixel data of two adjacent upper and lower lines are read in a mixed manner.

The image data read from the imaging device 3 in the field reading mode are supplied to the A/D converter 11 via the CDS/AGC circuit 4 and the cable 10 so as to be converted into digital signals which are then supplied to the camera process circuit 23.

The camera process circuit 23 conducts processing in the image data read in the field reading mode, so as to finally produce analog video signals.

In the meantime, the digitized field-read image data are supplied also to the camera process circuit 15, via the change-over switch 26 which is under the control of the system controller 20. Upon receipt of the digitized field-read image data, the camera process circuit 15 operates to produce a luminance signal and chromatic signals.

The luminance signal and the chromatic signals are supplied to the horizontal scaler 16 which performs transformation of the data into 1:1 aspect ratio.

The output from the scaler 16 is supplied to the transferring buffer memory 17 which stores data corresponding to one frame. The contents of this buffer memory are transferred to the PC in the same procedure as that described before in connection with FIG. 1. Upon completion of the transfer of the one-frame data, the buffer memory 17 now empty starts to receive image data of the second frame. The second frame thus formed is then transferred to the PC in the same manner as the first frame.

As a result of repetition of the data receiving and transfer operations as described, a quasi-moving picture is displayed on the PC. This quasi-moving picture can most conveniently be used for the purpose of determination of the viewing angle of the high-resolution still image which is to be captured.

In order to enhance the frame rate of the quasi-moving picture, it is advisable that the buffer memory 17 accumulates only the pixel data corresponding to one frame, so as to reduce the data size, thus contributing to reduction of the time required for the data transfer to the PC.

In the transfer of the frame data, a thinning at a rate of ½ or ⅓ or data compression such as by JPEG may be effected so as to further reduce the data size, thus contributing to a further reduction of the transfer time, i.e., to a further increase of the frame rate.

The arrangement may be such that the analog video signals from the camera process circuit 23 are connected to the television monitor, so as to enable monitoring of the image during the framing.

The operation for capturing the high-resolution still image is executed after the framing. In this operation, the system controller 20 supplies a control signal to the microcomputer 7 which in turn activates the rotary driving circuit 25, thereby rotating, for example, the Y-direction quartz low-pass filter.

Figure 21:
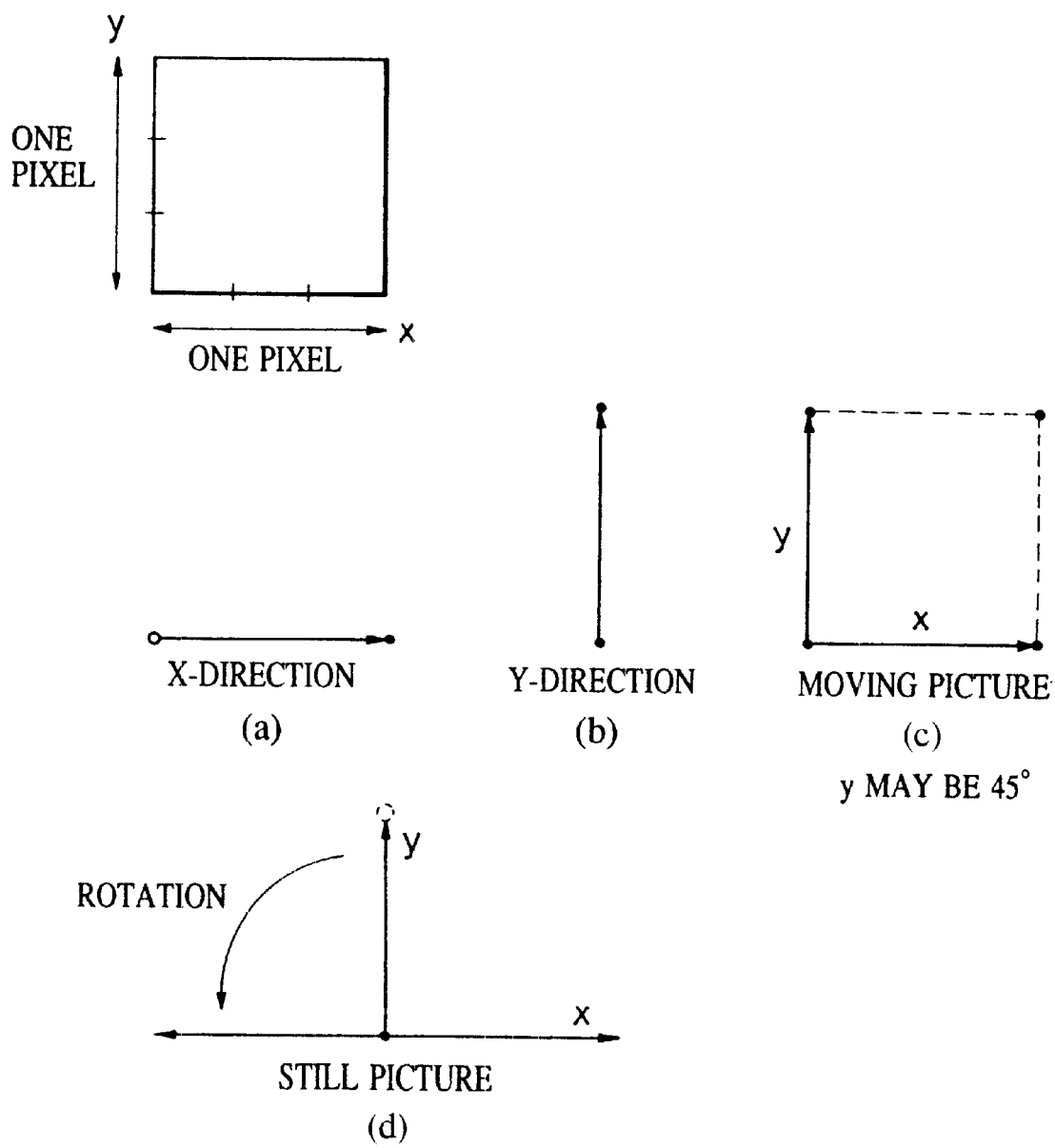
FIG. 21 is an illustration of the operation of the optical low-pass filter and change in the characteristic of the same.

As a consequence, this quartz low-pass filter exhibits its birefringence in the −X direction, as will be seen from (d) of FIG. 21. This birefringence serves to cancel the effect of birefringence of the X-direction quartz low-pass filter, thus enabling capturing of the high-resolution still image.

In the meantime, the microcomputer 7 controls the TG 6 so that the imaging device 3 is operated in the all-pixel frame reading mode.

Thereafter, capturing of the high-resolution still image is executed through the pixel-shifting operation in the same way as that in the first embodiment, and the thus captured still image is transferred to the PC.

As will be understood from the foregoing description, in the second embodiment of the present invention, the function of the optical low-pass filter is canceled when the high-resolution still image is captured. This, however, is only illustrative and an arrangements of quartz low-pass filters as shown in FIG. 22 may be used instead of the quartz low-pass filters described in connection with FIG. 21.

Referring to FIG. 22, the section (a) of this Figure shows the same arrangement as that shown in (a) of FIG. 21. In regard to section (b), however, a ⅘ pixel pitch quartz birefringence plate is used in an oblique direction.

During the operation in the mode for picking up moving images, the arrangement shown in sections (a) and (b) serves mainly to remove false color signals of the moving image appearing in the oblique direction, whereas, in the mode for picking up high-resolution still images, the optical low-pass filtering effect in the X-direction at ⅓ pixel pitch remains even after the canceling as shown in section (d) of FIG. 22, whereby the image quality is improved due to elimination of false color signals appearing in the X-direction.

Section (e) of FIG. 22 illustrates an operation in which both the quartz plate of the X-direction and the quartz plate of the oblique direction are rotated in such a manner that a ⅓ pixel-pitch low-pass filtering effect in the Y-direction remains valid. With this arrangement, it is possible to reduce false color signals appearing in the Y-direction on the high-resolution still image. Further, section (f) shows an operation in which the quartz plate of the X-direction alone is rotated such that the ⅓ pixel-pitch low-pass, filtering effect remains in the oblique direction. With this operation, it is possible to reduce false color signals appearing on the high-resolution still image in the oblique direction.

Third Embodiment

Figure 23:
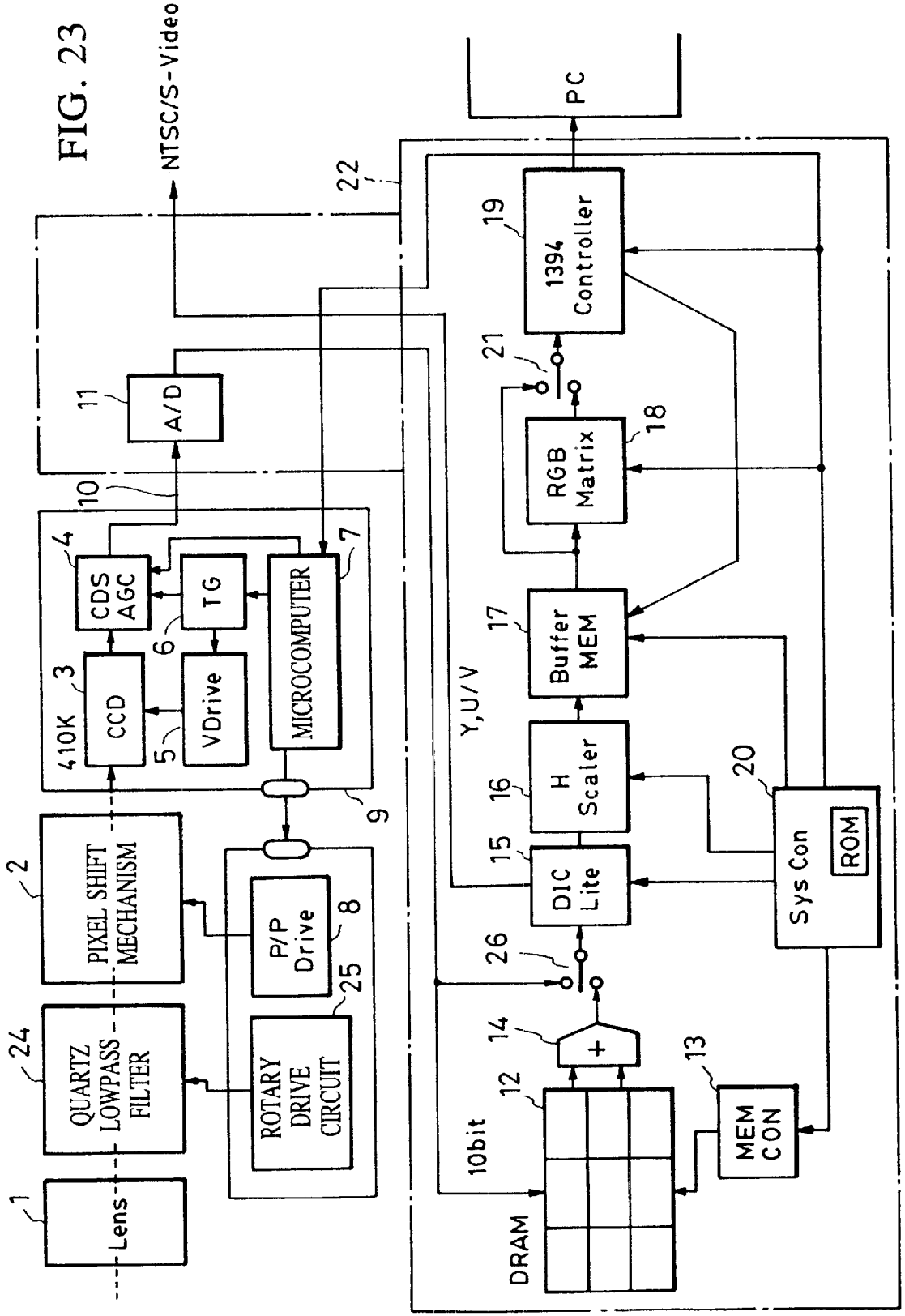
FIG. 23 is a block diagram of a third embodiment of the image pickup apparatus in accordance with the present invention.

FIG. 23 is a block diagram showing the construction of the third embodiment of the image pickup apparatus in accordance with the present invention. The third embodiment is different from the second embodiment shown in FIG. 19 in that it is devoid of the camera process circuit 23 shown in FIG. 23 and the analog video outputs are picked up from the camera process circuit 15. With this arrangement, it is possible to use an identical camera process circuit both for moving images and high-resolution still images.

Fourth Embodiment

Figure 24:
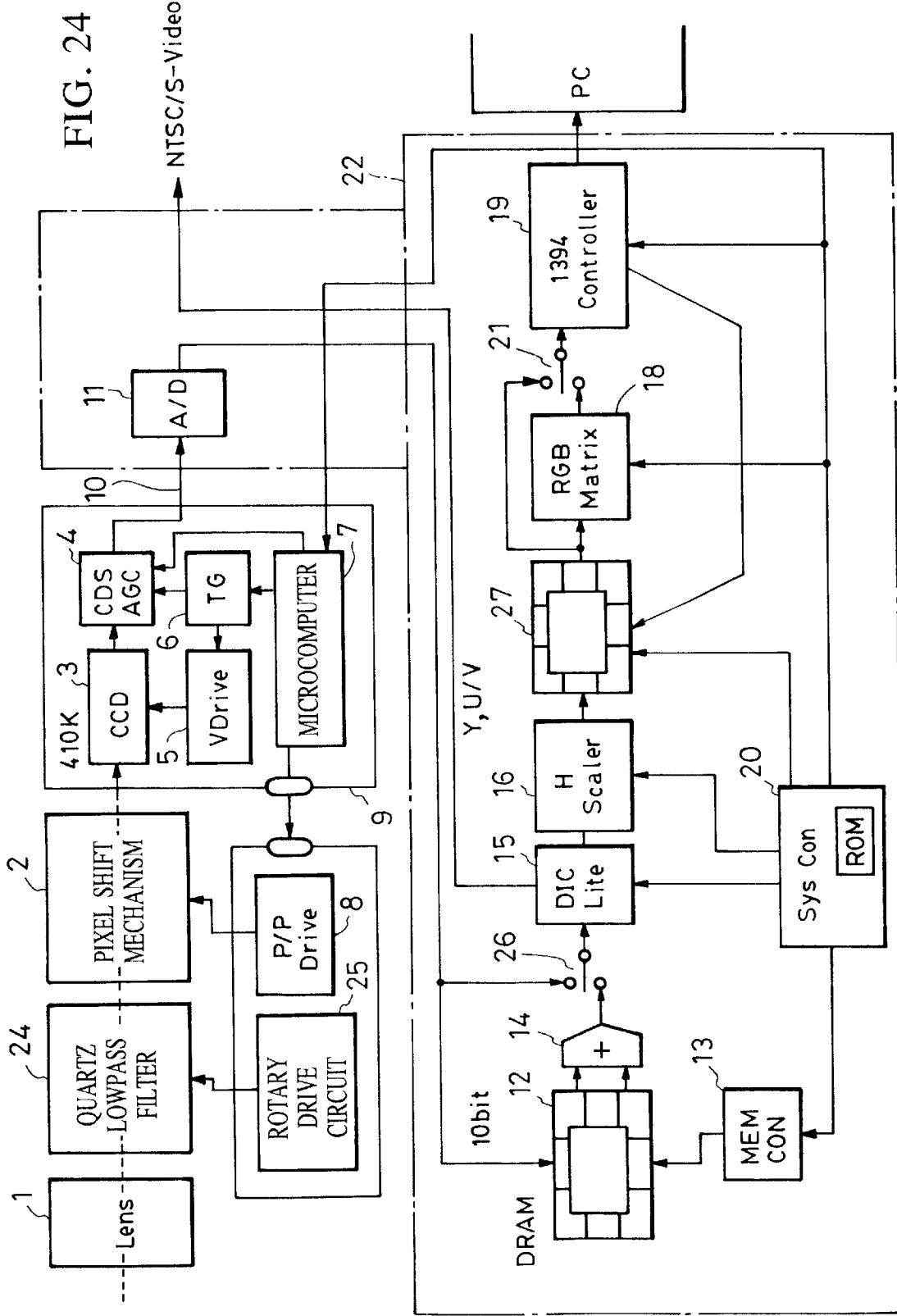
FIG. 24 is a block diagram of a fourth embodiment of the image pickup apparatus in accordance with the present invention.

FIG. 24 is a block diagram of the fourth embodiment of the image pickup apparatus in accordance with the present invention. Referring to this Figure, numeral 27 designates a buffer memory which is used for the purpose of transferring image data and which has a storage capacity corresponding to at least nine frames. By virtue of the use of this buffer memory 27 having the storage capacity large enough to accommodate pixel data of nine frames, it is possible to transfer only the desired frame to the PC, without requiring the transfer of all frames.

More specifically, the user of the PC is allowed to preview the image in the moving image pickup mode and can designates, in the form of a rectangular region, the portion of the image of interest, i.e., the portion to be captured in the form of a high-resolution still image. The designation of the region may be effected, for example, by pointing the region on the PC display by means of a pointer such as a mouse, although other methods can be used equally well.

According to the described fourth embodiment of the invention, the PC user can conduct all of the series of processings such as framing while monitoring moving picture, confirmation of the image, capturing of the high-resolution still image, edition and so forth, by suitably operating the PC while monitoring the display on the PC.

Thus, the first to fourth embodiments described hereinbefore enables efficient pickup of images while achieving a high degree of resolution well comparing to that of scanners, with reduced number of pixel-shifting cycles. The described embodiments also enables high-speed processing of data and greatly save the image memory area, thus offering remarkable advantage from the viewpoint of costs.

Furthermore, since the image data after the pixel-shifting operation can be treated as a field image, an existing camera process circuit for moving image, i.e., camera IC's, can conveniently be used for the purpose of data processing. Consequently, the data can be processed at an extremely high rate, i.e., in a very short time, as compared with the conventional technique which relies upon time-consuming processing using software.

In addition, the-pixel-shifting algorithm of the described embodiments requires much fewer pixel-shifting cycles as compared with the known pixel-shifting technique. For instance, while the conventional technique requires shifting to 36 locations when the pixel shift is conducted at the pitch amounting to ⅓ pixel pitch, the described embodiments require pixel shifting only to 9 locations.

This not only offers a higher efficiency of use of memory and higher rates of image pickup processing but also increases the operation speed of the pixel-shifting mechanism and simplifies the construction of this mechanism.

It is also possible to reduce false color signals in high-resolution still images, by the use of a low-pass filter adapted for the pixel-shifting system, thus achieving an improvement of the image quality matching with the enhancement of the resolution.

The image pickup apparatus of the present invention can be equipped with an ordinary video output function in addition to the function for outputting high-resolution still images. The image pickup apparatus, therefore, can pickup not only high-resolution still images but also moving images. If the posture of the camera head incorporating the image pickup section is variable, the camera can pickup images of persons, scenery and so forth as is the case of ordinary video cameras and can be used for picking up moving images of participants of a television conference.

The optical low-pass filter used in the image pickup apparatus of the present invention may be of the type which permits its characteristics to be changed so as to adapt itself selectively both to the mode for picking up high-resolution still images and the mode for picking up moving images. Thus, it is possible to suppress generation of false color signals in each of these two modes.

Furthermore, advantages are also brought about in regard to costs and installation space, because an identical camera process circuit can be used both in the mode for picking up high-resolution still image and in the mode for picking up moving images.

Furthermore, since the images picked up through the pixel-shifting operation are temporarily stored in a transferring buffer memory, it is possible to transfer only the desired selected portion of the data to, for example, a PC. This feature is particularly useful when a shorter transferring time is preferentially required over other requirements.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image pickup apparatus, comprising:
   (a) a pixel shifting device adapted to shift a light beam incoming upon the imaging surface of an imaging device at intervals of every ⅔ pixel,
   (b) an image memory which stores pixel data obtained at each of the positions to which said light beam is shifted by said pixel shifting device;
   (c) a memory controller adapted to cause said image memory to store said pixel data and adapted to read the stored pixel data;
   (d) a color filter covering the imaging surface of said imaging device and having a regular arrangement formed by repetition of an 8-pixel unit block having two pixels in the line direction and 4 pixels in the column direction,
      wherein said pixel shifting device is operative to shift said light beam by an amount corresponding to ⅔ pixel pitch both in plus and minus directions, and
      wherein said image memory is capable of storing at least 9 frames of the pixel data, whereby said memory controller causes said image memory to store said pixel data in a spatial arrangement equivalent to the pixel data obtained by an imaginary imaging device having pixels of a number three times as large as that of said imaging device in each of line and column directions, while operating to enable reading of the stored pixel data in nine times such that the pixel data constituting one frame are read each time,
   said image pickup apparatus further comprising an image processing device which includes:
      an adding circuit which performs a computation for mixing pixel data read along upper and lower lines of pixels so as to enable reading of a field pixel data composed of pixel data of the upper and lower lines mixed together; and
      a camera process circuit for processing the mixed field pixel data outputted from said adding circuit,
      wherein said color filter has a staggered complementary-color pixel arrangement, and wherein said memory controller serves to cause said image memory to store pixel data read from said imaging device in a frame all-pixel reading mode in which the pixel data of the upper and lower lines are not mixed, said pixel shifting device including correcting means for effecting a pixel shift by one or ⅓ pixel pitch in the line direction so as to correct inversion of magenta and green pixel data at every two pixels as counted in the column direction.

2. An image pickup apparatus according to claim 4, wherein the pixel shift by one or ⅓ pixel pitch is performed by said correcting means only in image pickup operation for magenta and green fields while the pixel shift in the column direction is zero.

3. An image pickup apparatus according to claim 2, wherein an optical low-pass filter of ⅓ pixel pitch is disposed between an image pickup lens and said imaging device.

4. An image pickup apparatus according to claim 1, wherein said color filter is a color separation filter having an RGB Bayer arrangement.

5. An image pickup apparatus according to claim 1, wherein said image processing device further includes a buffer memory for transferring the pixel data and a digital output interface for external connection.

6. An image pickup apparatus comprising:
  (a) an imaging device which enables reading of pixel data both in a frame reading mode and a field reading mode;
  (b) a pixel shifting device adapted to shift a light beam incoming upon the imaging surface of an imaging device at intervals of every ⅔ pixel;
  (c) an image memory for storing pixel data read from said imaging device;
  (d) a memory controller for causing, in case that the pixel data read from said imaging device in the frame reading mode are written in said image memory, said image memory to store said pixel data in a spatial arrangement equivalent to the pixel data obtained by an imaginary imaging device having pixels of a number 3 times as large as that of said imaging device in each of line and column directions, and for dividing the stored pixel data into frames to enable reading of the stored pixel data in a plurality of times on a frame-by-frame basis;
  (e) camera processing adapted to process field-read pixel data obtained through a computation for mixing pixel data of a plurality of lines performed on the pixel data read by said memory controller from said image memory; and
  (f) an optical low-pass filter and an optical low-pass filter controlling device adapted to cancel the function of said optical low-pass filter, said optical low-pass filter controlling device being operative to validate the function of said optical low-pass filter when pixel data signals are read and outputted from said imaging device in the field reading mode with the pixel data of a plurality of lines mixed together, while canceling said function when pixel data is read from said imaging device in said frame reading mode,
  wherein said optical low-pass filter controlling device is operative to rotate one of a pair of birefringence quartz plates arranged at 1 pixel pitch.

7. An image pickup apparatus according to claim 6, further comprising a color filter covering the imaging surface of said imaging device and having a regular arrangement formed by repetition of an 8-pixel unit block having two pixels in the line direction and 4 pixels in the column direction, wherein said pixel shifting device is operative to shift said light beam by an amount corresponding to ⅔ pixel pitch both in plus and minus directions, and wherein said image memory is capable of storing at least 9 frames of the pixel data, whereby said memory controller causes said image memory to store said pixel data in a spatial arrangement equivalent to the pixel data obtained by an imaginary imaging device having pixels of a number three times as large as that of said imaging device in each of line and column directions, while operating to enable reading of the stored pixel data in nine times such that the pixel data constituting one frame are read each time.

8. An image pickup apparatus according to claim 7, wherein said color filter has a staggered complementary-color pixel arrangement, and wherein said memory controller serves to cause said image memory to store pixel data read from said imaging device in said frame reading mode in which the pixel data of the upper and lower lines are not mixed, said pixel shifting device including a correcting device for effecting a pixel shift by one or ⅓ pixel pitch in the line direction so as to correct inversion of magenta and green pixel data at every two pixels as counted in the column direction.

9. An image pickup apparatus according to claim 8, wherein the pixel shift by one or ⅓ pixel pitch is performed by said correcting device only in image pickup operation for magenta and green fields while the pixel shift in the column direction is zero.

10. An image pickup apparatus according to claim 6, wherein said optical low-pass filter controlling means is operative to cause a relative rotation between a one pixel-pitch optical low-pass filter and a ⅓ pixel-pitch optical low-pass filter.

11. An image pickup apparatus according to claim 6, wherein a moving image pickup mode and the function of said optical low-pass filter are validated when the field-read signals are outputted from said imaging device, while, when pixel data area read from said imaging device in the frame reading mode, a still image pickup mode is validated.

12. An image pickup apparatus according to claim 11, wherein an identical camera process circuit is used both for the camera process for processing the pixel data read from said imaging device in the field reading mode and the camera process for processing the field-read pixel data obtained through the computation for mixing the pixel data of a plurality of lines read by said memory controller from said imaging device.

13. An image pickup apparatus according to claim 12, further comprising: a transferring buffer memory capable of storing image data of the frames read from said image memory; and a transferring device capable of performing a high-rate transfer of only the image data of a desired one of the frames stored in said buffer memory.

14. An image pickup apparatus according to claim 13, wherein said color filter is a color separation filter having an RGB Bayer arrangement.

15. An image pickup apparatus, comprising:
  (a) an imaging device provided with a color filter having a regular arrangement formed by repetition of an 8-pixel unit block having two pixels in the line direction and 4 pixels in the column direction;
  (b) pixel shifting means operative to shift a light beam impinging upon the imaging surface of said imaging device at intervals of every ⅔ pixel pitch both in plus and minus directions;
  (c) A/D converter means for converting the pixel data accumulated on said imaging device into digital data;
  (d) an image memory capable of storing at least 9 frames of digital pixel data outputted from said A/D converter means;
  (e) a memory controller for arranging the pixel data to be written in said image memory in a spatial arrangement equivalent to the pixel data obtained by an imaginary imaging device having pixels of a number three times as large as that of said imaging device in each of line and column directions;
  (f) an adder circuit which performs a computation for mixing pixel data of a plurality of pixel lines read from said image memory; and (g) camera process means for processing the plural-line-mixed field-read pixel data outputted from said adder circuit, wherein said color filter has a staggered complementary-color pixel arrangement, and wherein said pixel shifting means includes correcting means for effecting a pixel shift by one or ⅓ pixel pitch in the line direction so as to correct inversion of magenta and green pixel data at every two pixels as counted in the column direction.

16. An image pickup apparatus according to claim 15, wherein said memory controller enables the pixel data to be read from said image memory in nine times such that the pixel data constituting one frame are read each time.

17. An image pickup apparatus according to claim 15, wherein the pixel shift by one or ⅓ pixel pitch is performed by said correcting means only in image pickup operation for magenta and green fields while the pixel shift in the column direction is zero.

18. An image pickup apparatus according to claim 17, wherein an optical low-pass filter of ⅓ pixel pitch is disposed between an image pickup lens and said imaging device.

19. An image pickup apparatus according to claim 15, wherein said color filter is a color separation filter having an RGB Bayer arrangement.

20. An image pickup apparatus according to claim 15, wherein said image processing means further includes a buffer memory for transferring the pixel data and a digital output interface for external connection.

21. An image pickup apparatus, comprising:

(a) an imaging device provided with a color filter having a regular arrangement formed by repetition of an 8-pixel unit block having two pixels in the line direction and 4 pixels in the column direction;

(b) imaging device driving means operative both in an all-pixel frame reading mode in which all the pixel data are read from said imaging device in the form of frames and a field reading mode in which pixel data of a plurality of lines are read from said imaging device in a mixed manner;

(c) pixel shifting means operative to shift a light beam impinging upon the imaging surface of said imaging device at intervals of every ⅔ pixel pitch both in plus and minus directions;

(d) an optical low-pass filter;

(e) an image memory for storing at least 9 frames of the pixel data accumulated in said imaging device;

(f) controlling means for operating said pixel shifting means and causing said imaging device driving means to drive said imaging device in the all-pixel frame reading mode and for arranging the pixel data read from said imaging device and written in said image memory into a spatial arrangement equivalent to the pixel data obtained by an imaginary imaging device having pixels of a number three times as large as that of said imaging device in each of line and column directions; and (g) camera process means operable in a moving image pickup mode in which the plural-line-mixed image data read from said imaging device is processed and in a still image pickup mode in which the image data read from said image memory is processed in the form of field-read data by mixing pixel data of a plurality of lines, wherein said color filter has a staggered complementary-color pixel arrangement, and wherein said pixel shifting means includes correcting means for effecting a pixel shift by one or ⅓ pixel pitch in the line direction so as to correct inversion of magenta and green pixel data at every two pixels as counted in the column direction.

22. An image pickup apparatus according to claim 21, wherein said controlling means enables the pixel data to be read from said image memory in nine times such that the pixel data constituting one frame are read each time.

23. An image pickup apparatus according to claim 22, further comprising: a transferring buffer memory capable of storing image data of the frames read from said image memory; and transferring means capable of performing a high-rate transfer of only the image data of a desired one of the frames stored in said buffer memory.

24. An image pickup apparatus according to claim 23, wherein said transferring means includes a digital output interface for external connection.

25. An image pickup apparatus according to claim 21, wherein the pixel shift by one or ⅓ pixel pitch is performed by said correcting means only in image pickup operation for magenta and green fields while the pixel shift in the column direction is zero.

26. An image pickup apparatus according to claim 25, wherein said optical low-pass filter controlling means has a function for canceling the function of said optical low-pass filter, and is operative to validate the function of said optical low-pass filter in a moving image pickup mode in which plural-line-mixed field-read signals are outputted from said imaging device and to cancel the function of said optical low-pass filter in a still image pickup mode in which pixel data are read in all-pixel frame reading mode from said imaging device.

27. An image pickup apparatus according to claim 26, wherein said optical low-pass filter controlling means is operative to rotate one of a pair of birefringence quartz plates arranged at 1 pixel pitch.

28. An image pickup apparatus according to claim 26, wherein said optical low-pass filter controlling means is operative to cause a relative rotation between a one pixel-pitch optical low-pass filter and a ⅓ pixel-pitch optical low-pass filter.

29. An image pickup apparatus according to claim 28, wherein the moving image pickup mode and the function of said optical low-pass filter are validated when the plural-line-mixed field-read signals are outputted from said imaging device, while, when pixel data area read from said imaging device in the all-pixel frame reading mode, the still image pickup mode is validated.

30. An image pickup apparatus according to claim 21, wherein said color filter is a color separation filter having an RGB Bayer arrangement.

31. An image pickup apparatus according to claim 21, wherein said camera processing means includes a camera processing circuit which is used for processing the pixel data read from said imaging device in the plural-line-mixed field reading mode and another separate camera processing circuit which is used for processing the plural-line-mixed field-read pixel data obtained through the computation for mixing the pixel data of a plurality of lines read by said memory controller from said imaging device.

32. An image pickup apparatus according to claim 21, wherein said camera processing means uses an identical camera process circuit both for the processing of the pixel data read from said imaging device in the plural-line-mixed field reading mode and for processing the plural-line-mixed field-read pixel data obtained through the computation for mixing the pixel data of a plurality of lines read by said memory controller from said imaging device.

33. An image pickup method, comprising the steps of:
effecting a pixel shift by shifting a light beam incoming upon the imaging surface of an imaging device at intervals of every ⅔ pixel;
storing in an image memory the pixel data obtained at each of the positions to which said light beam is shifted;
causing said image memory to store said pixel data and to read the stored pixel data in a plurality of times such that one frame is read each time;
providing on said imaging device a color filter having a regular arrangement formed by repetition of an 8-pixel unit block having two pixels in the line direction and 4 pixels in the column direction;
effecting the pixel shift by an amount corresponding to ⅔ pixel pitch both in plus and minus directions;
performing writing of 9 frames of pixel data in said image memory, in a spatial arrangement having pixels of a number three times as large as that of said imaging device in each of line and column directions; and
reading the stored pixel data in nine times such that the pixel data constituting one frame are read each time,
wherein a staggered complementary-color pixel arrangement is used as said color filter, said method further comprising: effecting a pixel shift by one or ⅓ pixel pitch in the line direction so as to correct inversion of magenta and green pixel data at every two pixels as counted in the column direction; and storing, in said image memory, pixel data read from said imaging device in a frame all-pixel reading mode in which the pixel data of the upper and lower lines are not mixed.

34. An image pickup method according to claim 33, further comprising: executing an image processing which includes: performing a computation for mixing pixel data read along upper and lower lines of pixels so as to enable reading of a field pixel data composed of pixel data of the upper and lower lines mixed together; and a camera processing on the mixed field-read data.

35. An image pickup method according to claim 34, wherein a color filter having an RGB Bayer arrangement is used as said color filter.

36. An image pickup method according to claim 35, further comprising: placing an optical low-pass filter of ⅓ pixel pitch between an image pickup lens and said imaging device.

37. An image pickup method according to claim 33, wherein the pixel shift by one or ⅓ pixel pitch is performed only in image pickup operation for magenta and green fields while the pixel shift in the column direction is zero.

38. An image pickup method, comprising the steps of:
reading, in a moving image pickup mode, pixel data from an imaging device in a field reading mode and performing a camera process on the read pixel data;
performing, in a still image pickup mode, a pixel shifting operation for shifting a light beam incoming upon the imaging surface of an imaging device at intervals of every ⅔ pixel, and reading of image data from said imaging device in a frame reading mode;
storing, when writing in an image memory the image data read from said imaging device in the frame reading mode, the read data in a spatial arrangement having pixels of a number 3 times as large as that of said imaging device in each of line and column directions;
dividing the pixel data stored in said image memory into a plurality of frames and reading the stored pixel data in a plurality of times such that one frame is read each time;
performing a camera process on the field-read pixel data obtained through a computation for mixing pixel data of a plurality of lines performed on the pixel data read from said image memory;
providing on said imaging device a color filter having a regular arrangement formed by repetition of an 8-pixel unit block having two pixels in the line direction and 4 pixels in the column direction;
effecting the pixel shift by an amount corresponding to ⅔ pixel pitch both in plus and minus directions;
storing the pixel data to be written into said image memory in a spatial arrangement having pixels of a number three times as large as that of said imaging device in each of line and column directions; and
dividing the stored pixel data into nine frames and reading the stored pixel data in nine times such that the pixel data constituting one frame are read each time,
wherein said color filter has a staggered complementary-color pixel arrangement, and wherein the pixel shift is effected by one or ⅓ pixel pitch in the line direction so as to correct inversion of magenta and green pixel data at every two pixels as counted in the column direction.

39. An image pickup method according to claim 38, wherein the correcting pixel shift by one or ⅓ pixel pitch is performed only in image pickup operation for magenta and green fields while the pixel shift in the column direction is zero.

40. An image pickup method according to claim 39, wherein said color filter is a color separation filter having an RGB Bayer arrangement.

41. An image pickup method according to claim 38, further comprising: preparing an optical low-pass filter and an optical low-pass filter controlling device for canceling the function of said optical low-pass filter; validating the function of said optical low-pass filter when pixel data signals read from said imaging device in the field reading mode are outputted; and canceling said function when pixel data is read from said imaging device in the frame reading mode.

42. An image pickup method according to claim 41, wherein said optical low-pass filter controlling device is operative to rotate one of a pair of birefringence quartz plates arranged at 1 pixel pitch.

43. An image pickup method according to claim 41, wherein said optical low-pass filter controlling device is operative to cause a relative rotation between a one pixel-pitch optical low-pass filter and a ⅓ pixel-pitch optical low-pass filter.

44. An image pickup method according to claim 38, wherein the field-read data are obtained by performing a computation on the image data read from said image memory so as to mix the pixel data of a plurality of lines, whereby an identical camera processing circuit is used both for processing the pixel data read from said imaging device in the field reading mode and for processing the field-read data obtained through the computation.

* * * * *

UNITED STATES PATENT AND TRADEMARK OFFICE
CERTIFICATE OF CORRECTION

PATENT NO. : 6,678,000 B1
DATED : January 13, 2004
INVENTOR(S) : Tsuguhide Sakata It is certified that error appears in the above-identified patent and that said Letters Patent is hereby corrected as shown below:

Title page,
Item [57], ABSTRACT, "pixel-shifting" should read -- pixel shifting --.

Column 24,
Line 66, "claim 4," should read -- claim 1, --.

Column 22,
Line 67, "designates" should read -- designate --.

Signed and Sealed this

Third Day of August, 2004

JON W. DUDAS
*Acting Director of the United States Patent and Trademark Office*